(12) United States Patent  
Shiiyama

(10) Patent No.: US 6,430,566 B1  
(45) Date of Patent: Aug. 6, 2002

(54) IMAGE PROCESSING APPARATUS AND CONTROL METHOD THEREFOR

(75) Inventor: Hirotaka Shiiyama, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/058,206

(22) Filed: Apr. 10, 1998

(30) Foreign Application Priority Data

Apr. 14, 1997 (JP) .............................................. 9-095839  
Apr. 14, 1997 (JP) .............................................. 9-095840  
Apr. 15, 1997 (JP) .............................................. 9-097345

(51) Int. Cl.$^7$ ............................................. G06F 17/00
(52) U.S. Cl. ..................... 707/102; 382/173; 382/190
(58) Field of Search ............... 707/1–206; 382/173–203

(56) References Cited

U.S. PATENT DOCUMENTS 5,390,259 A  *  2/1995  Withgott et al. ............ 382/173  
5,664,126 A  *  9/1997  Hirakawa et al. ............. 707/10  
5,860,075 A  *  1/1999  Hashizume et al. ........... 707/6

FOREIGN PATENT DOCUMENTS

WO   WO/06912   3/1995  
WO   WO 95/06912   3/1995

OTHER PUBLICATIONS

Faloutsos et al., "Efficient and Effective Querying by Image Content," J. Intelligent Info. Sys., vol. 3, No. 3/04, Jul. 1, 1994, pp. 231–262.

Pat. Abs. Jp., vol. 013, No. 284 (P–892), Jun. 29, 1989 (JP 01 070874 A).

Lee et al., "Query B Image Content Using Multiple Objects And Multiple Features: User Interface Issues," Proc. Int. Conf. Image Prec., vol. 2, No. Conf. 1, Nov. 13, 1994, IEEE, pp. 76–80.

* cited by examiner

Primary Examiner—David Jung  
(74) Attorney, Agent, or Firm—Fitzpatrick, Cella, Harper & Scinto

(57) ABSTRACT

A retrieval condition for retrieving desired image data is input from a user interface, and the input retrieval condition is analyzed by a text processing unit. On the basis of the analysis result, a retrieval result notification unit outputs a question to prompt the user to input a retrieval condition different from the previously input retrieval condition. A retrieval condition is input from the user interface in accordance with the output question. A retrieval unit retrieves image data on the basis of the input retrieval condition.

67 Claims, 18 Drawing Sheets

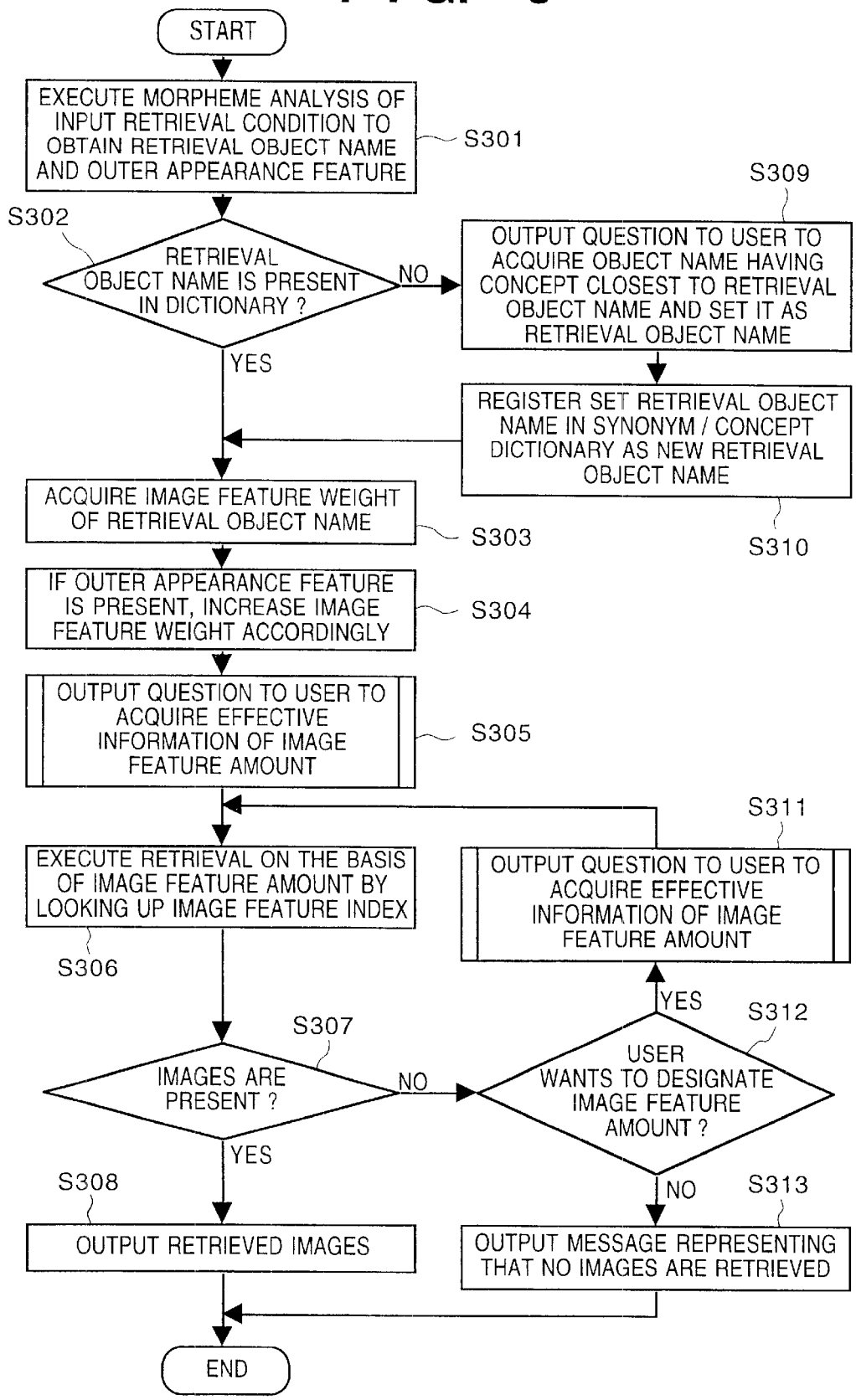

FIG. 6

| WORD INPUT | AUTOMOBILE | | |
|---|---|---|---|
| LIST OF WORDS HAVING CLOSE CONCEPTS | CONCEPTUAL RELATIONSHIP | CONCEPTUAL DISTANCE | |
| CAR | SPECIFIC | 3 | |
| MOBILE UNIT | SPECIFIC | 4 | |
| WHEELED VEHICLE | GENERIC | 5 | |
| SPORT CAR | SPECIFIC | 5 | |
| VEHICLE | GENERIC | 15 | |

BACK
FORWARD
SEARCH
CANCEL
OK

FIG. 7

WORD BEING SELECTED 「AUTOMOBILE」

| LIST OF WORDS HAVING ADJACENT CONCEPTS | CONCEPTUAL RELATIONSHIP | CONCEPTUAL DISTANCE |
|---|---|---|
| CAR | SPECIFIC | 3 |
| MOBILE UNIT | SPECIFIC | 4 |
| WHEELED VEHICLE | GENERIC | 5 |

CANCEL
OK

IMAGE FEATURE WEIGHT : ( COLOR, TEXTURE,... )
IN THIS EXAMPLE, SQUARE-SUM OF EACH
COMPONENT IS NORMALIZED TO 100

FIG. 11

RETRIEVAL CONDITION [MOTORCAR]

RETRIEVAL OBJECT : MOTORCAR

QUESTION : RETRIEVAL OBJECT IS LARGE ?

ANSWER : ⦿ YES
◎ NO

[CANCEL]
[OK]

FIG. 12

RETRIEVAL CONDITION [MOTORCAR]

RETRIEVAL OBJECT : MOTORCAR

QUESTION : BACKGROUND ?

ANSWER : DESIGNATE WITH OBJECT NAME

[CANCEL]
[OK]

IMAGE PROCESSING APPARATUS AND CONTROL METHOD THEREFOR

BACKGROUND OF THE INVENTION

1. Field of the Invention

The present invention relates to an image processing apparatus for managing image data and a control method therefor.

2. Description of the Related Art

Conventionally, when image data is to be retrieved using an image processing apparatus which manages image data obtained by reading a natural image with a scanner or the like, direct image data retrieval cannot be performed because an image recognition technique for image data is difficult to realize. For this reason, generally, a description and keyword representing the image data are added to the image data in reading and used to retrieve the image data.

In the conventional image processing apparatus, however, especially when the number of image data to be managed is large, description/keyword addition is labor-intensive. To reduce the labor, image data may be managed without adding any description and keyword. In this case, thumbnail images of all image data being managed must be displayed, and the user must select a desired one of the thumbnail images to retrieve the image data. Such an apparatus is inconvenient to use and poor in efficiency.

Additionally, since many new words are being coined recently, demand for retrieval under a retrieval condition input using a newly coined word, i.e., retrieval according to the taste or need of a user has arisen.

SUMMARY OF THE INVENTION

The present invention has been made in consideration of the above problem, and has as its object to provide an image processing apparatus and method which allow easy and efficient retrieval according to the taste of a user without adding any description and keyword for managing image data.

In order to achieve the above object, according to an aspect of the present invention, there is provided an image processing apparatus for managing image data, comprising:

first input means for inputting a first retrieval condition for retrieving desired image data;

analysis means for analyzing the retrieval condition input by the first input means;

output means for outputting a question on the basis of an analysis result from the analysis means to prompt a user to input a second retrieval condition different from the first retrieval condition;

second input means for inputting the second retrieval condition in accordance with the question output by the output means; and retrieval means for retrieving image data on the basis of the first and second retrieval conditions.

Preferably, the analysis means analyzes a morpheme and modification of the first retrieval condition to acquire a retrieval object name constituting the first retrieval condition and an outer appearance feature of an object represented by the retrieval object name.

Also, the analysis means preferably comprises storage means for storing a synonym/concept dictionary for managing synonyms in units of concepts, extraction means for extracting a word corresponding to the retrieval object name by looking up the synonym/concept dictionary, and calculation means for calculating an image feature amount based on the word extracted by the extraction means and the outer appearance feature.

Moreover, when the outer appearance feature of the object represented by the retrieval object name has not been acquired by the analysis means, the output means preferably outputs a question to prompt the user to input the outer appearance feature of the object represented by the retrieval object name.

In addition, when the question has been output by the output means to prompt the user to input the outer appearance feature of the object represented by the retrieval object name, the second input means preferably inputs the outer appearance feature of the object represented by the retrieval object name in accordance with the question.

Also, when the outer appearance feature of the object represented by the retrieval object name has been input by the second input means, calculation means preferably calculates an image feature amount based on a word extracted by extraction means and the outer appearance feature.

Furthermore, when a word corresponding to the retrieval object name has not been extracted by extraction means, the output means preferably outputs a question to prompt the user to input a word having a concept close to the object represented by the retrieval object name.

Preferably, when the question has been output by the output means to prompt the user to input the word having a concept close to the object represented by the retrieval object name, the second input means inputs a word having a concept close to the object represented by the retrieval object name and an outer appearance feature of an object represented by the word in accordance with the question.

Also, when a word having a concept close to the object represented by the retrieval object name and an outer appearance feature of an object represented by the word have been input by the second input means, calculation means preferably calculates an image feature amount based on the word and the outer appearance feature.

Finally, when the word having the concept close to the object represented by the retrieval object name has been input by the second input means, the retrieval object name is preferably registered in the synonym/concept dictionary on the basis of a conceptual level of the word.

In order to achieve the above object, according to another aspect of the present invention, there is provided a method of controlling an image processing for managing image data, comprising:

the first input step of inputting a first retrieval condition for retrieving desired image data;

the analysis step of analyzing the retrieval condition input in the first input step;

the output step of outputting a question on the basis of an analysis result in the analysis step to prompt a user to input a second retrieval condition different from the first retrieval condition;

the second input step of inputting the second retrieval condition in accordance with the question output in the output step; and the retrieval step of retrieving image data on the basis of the first and second retrieval conditions.

In order to achieve the above object, according to still another aspect of the present invention, there is provided a computer readable memory which stores program codes for controlling an image processing apparatus for managing image data, comprising:

a program code for the first input step of inputting a first retrieval condition for retrieving desired image data;

a program code for the analysis step of analyzing the retrieval condition input in the first input step;

a program code for the output step of outputting a question on the basis of an analysis result in the analysis step to prompt a user to input a second retrieval condition different from the first retrieval condition;

a program code for the second input step of inputting the second retrieval condition in accordance with the question output in the output step; and a program code for the retrieval step of retrieving image data on the basis of the first and second retrieval conditions.

In order to achieve the above object, according to still another aspect of the present invention, there is provided an image processing apparatus for managing image data, comprising:

extraction means for extracting an image feature amount of the image data;

first storage means for storing correspondence between the image feature amount extracted by the extraction means and the image data in an image feature amount index;

second storage means for, when retrieval information used to retrieve image data is added to the image data, storing correspondence between the retrieval information and the image data in a retrieval information index;

input means for inputting a retrieval condition for retrieving desired image data;

first retrieval means for retrieving image data having retrieval information corresponding to the retrieval condition input by the input means by looking up the retrieval information index;

execution means for setting a new retrieval condition in accordance with a retrieval result from the first retrieval means, and repeatedly executing retrieval by the first retrieval means;

acquisition means for monitoring the number of times the retrieval is executed by the execution means and acquiring image data retrieved by the first retrieval means in accordance with a monitor result;

second retrieval means for retrieving image data similar to the image data acquired by the acquisition means on the basis of the image feature amount of the image data by looking up the image feature amount index; and display means for displaying image data corresponding to the retrieval condition on the basis of the image data acquired by the acquisition means and image data retrieved by the second retrieval means.

Preferably, the apparatus further comprises third storage means for storing a synonym/concept dictionary for managing synonyms in units of concepts.

Also, when no image data have been retrieved under the retrieval condition input by the input means, the execution means preferably acquires a synonym of conceptual level next to a conceptual level of the retrieval condition by looking up the synonym/concept dictionary and sets the acquired synonym as a new retrieval condition.

In addition, when no image data have been retrieved under the retrieval condition input by the input means, the execution means preferably acquires a synonym within a predetermined conceptual level from a conceptual level of the retrieval condition by looking up the synonym/concept dictionary and sets the acquired synonym as a new retrieval condition.

Moreover, the first storage means preferably stores correspondence between image feature amounts of a plurality of representative image data and the representative image data in the image feature amount index in advance.

Also, the representative image data is preferably image data to be retrieved by the first retrieval means at a frequency larger than a predetermined value and has the retrieval information.

Furthermore, the second storage means preferably stores correspondence between the retrieval information of the representative image data and the representative image data in the retrieval information index in advance.

In addition, when the image data acquired by the acquisition means include the representative image data, the second retrieval means preferably retrieves image data similar to the image data on the basis of an image feature amount of the representative image data by looking up the image feature amount index.

Preferably, the display means displays the image data corresponding to the retrieval condition as thumbnail images.

Also, when one of the thumbnail images displayed by the display means is selected, and display of a full-size image of the selected thumbnail image is requested, the second storage means preferably stores the retrieval condition as retrieval information of image data corresponding to the thumbnail image in the retrieval information index in correspondence with the image data.

Finally, the image data is preferably obtained by reading a natural image.

In order to achieve the above object, according to still another aspect of the present invention, there is provided a method of controlling an image processing apparatus for managing image data, comprising:

the extraction step of extracting an image feature amount of the image data;

the first storage step of storing correspondence between the image feature amount extracted in the extraction step and the image data in an image feature amount index;

the second storage step of, when retrieval information used to retrieve image data is added to the image data, storing correspondence between the retrieval information and the image data in a retrieval information index;

the input step of inputting a retrieval condition for retrieving desired image data;

the first retrieval step of retrieving image data having retrieval information corresponding to the retrieval condition input in the input step by looking up the retrieval information index;

the execution step of setting a new retrieval condition in accordance with a retrieval result in the first retrieval step, and repeatedly executing retrieval in the first retrieval step;

the acquisition step of monitoring the number of times the retrieval is executed in the execution step and acquiring image data retrieved in the first retrieval step in accordance with a monitor result;

the second retrieval step of retrieving image data similar to the image data acquired in the acquisition step on the basis of the image feature amount of the image data by looking up the image feature amount index; and the display step of displaying image data corresponding to the retrieval condition on the basis of the image data acquired in the acquisition step and image data retrieved in the second retrieval step.

In order to achieve the above object, according to still another aspect of the present invention, there is provided a computer readable memory which stores program codes for controlling an image processing apparatus for managing image data, comprising:

a program code for the extraction step of extracting an image feature amount of the image data;

a program code for the first storage step of storing correspondence between the image feature amount extracted in the extraction step and the image data in an image feature amount index;

a program code for the second storage step of, when retrieval information used to retrieve image data is added to the image data, storing correspondence between the retrieval information and the image data in a retrieval information index;

a program code for the input step of inputting a retrieval condition for retrieving desired image data;

a program code for the first retrieval step of retrieving image data having retrieval information corresponding to the retrieval condition input in the input step by looking up the retrieval information index;

a program code for the execution step of setting a new retrieval condition in accordance with a retrieval result in the first retrieval step, and repeatedly executing retrieval in the first retrieval step;

a program code for the acquisition step of monitoring the number of times the retrieval is executed in the execution step and acquiring image data retrieved in the first retrieval step in accordance with a monitor result;

a program code for the second retrieval step of retrieving image data similar to the image data acquired in the acquisition step on the basis of the image feature amount of the image data by looking up the image feature amount index; and a program code for the display step of displaying image data corresponding to the retrieval condition on the basis of the image data acquired in the acquisition step and image data retrieved in the second retrieval step.

In order to achieve the above object, according to still another aspect of the present invention, there is provided an image processing apparatus for managing image data, comprising:

extraction means for extracting an image feature amount of the image data;

first storage means for storing correspondence between the image feature amount extracted by the extraction means and the image data in an image feature amount index;

second storage means for, when retrieval information used to retrieve image data is added to the image data, storing correspondence between the retrieval information and the image data in a retrieval information index;

input means for inputting a retrieval condition for retrieving desired image data;

first retrieval means for retrieving image data having retrieval information corresponding to the input retrieval condition input by the input means by looking up the retrieval information index;

second retrieval means for retrieving image data similar to the image data retrieved by the first retrieval means on the basis of an image feature amount of the image data by looking up the image feature amount index; and display means for displaying image data corresponding to the retrieval condition on the basis of the image data retrieved by the first retrieval means and image data retrieved by the second retrieval means.

Preferably, the apparatus further comprises third storage means for storing a synonym/concept dictionary for managing synonyms in units of concepts.

Also, when no image data have been retrieved under the retrieval condition, the first retrieval means preferably retrieves image data again while setting a synonym closest to a concept of the retrieval condition as a retrieval condition by looking up the synonym/concept dictionary.

Moreover, when no image data have been retrieved under the retrieval condition, the first retrieval means preferably retrieves image data again while setting a synonym within a predetermined conceptual distance from a concept of the retrieval condition as a retrieval condition by looking up the synonym/concept dictionary.

In addition, when no image data have been retrieved under the retrieval condition, the first retrieval means preferably retrieves image data again while setting, as a retrieval condition, a synonym having a concept independently of the retrieval condition, a synonym for which a conceptual distance sum from a concept of the retrieval condition has a predetermined value, or each of three synonyms in ascending order of conceptual distance sums from a concept of the retrieval condition by looking up the synonym/concept dictionary.

Furthermore, the first storage means preferably stores correspondence between image feature amounts of a plurality of representative image data and the representative image data in the image feature amount index in advance.

Preferably, the representative image data is image data to be retrieved by the first retrieval means at a frequency larger than a predetermined value and has the retrieval information.

Also, the second storage means preferably stores correspondence between the retrieval information of the representative image data and the representative image data in the retrieval information index in advance.

In addition, when the image data acquired by the acquisition means include the representative image data, the second retrieval means preferably retrieves image data similar to the image data on the basis of an image feature amount of the representative image data by looking up the image feature amount index.

Also, when the retrieval condition contains predetermined information representing an image feature amount, the second retrieval means preferably retrieves image data similar to the image data retrieved by the first retrieval means on the basis of the image feature amount and that of the image data retrieved by the first retrieval means by looking up the image feature amount index.

Preferably, the display means displays the image data corresponding to the retrieval condition as thumbnail images.

In addition, when one of the thumbnail images displayed by the display means is selected, and display of a full-size image of the selected thumbnail image is requested, the second storage means preferably stores the retrieval condition as retrieval information of image data corresponding to the thumbnail image in the retrieval information index in correspondence with the image data.

Lastly, the image data is preferably obtained by reading a natural image.

In order to achieve the above object, according to still another aspect of the present invention, there is provided a method of controlling an image processing apparatus for managing image data, comprising:

the extraction step of extracting an image feature amount of the image data;

the first storage step of storing correspondence between the image feature amount extracted in the extraction step and the image data in an image feature amount index;

the second storage step of, when retrieval information used to retrieve image data is added to the image data, storing correspondence between the retrieval information and the image data in a retrieval information index;

the input step of inputting a retrieval condition for retrieving desired image data;

the first retrieval step of retrieving image data having retrieval information corresponding to the retrieval condition input in the input step by looking up the retrieval information index;

the second retrieval step of retrieving image data similar to the image data retrieved in the first retrieval step on the basis of the image feature amount of the image data by looking up the image feature amount index; and the display step of displaying image data corresponding to the retrieval condition on the basis of the image data retrieved in the first retrieval step and image data retrieved in the second retrieval step.

In order to achieve the above object, according to still another aspect of the present invention, there is provided a computer readable memory which stores program codes for controlling an image processing apparatus for managing image data, comprising:

a program code for the extraction step of extracting an image feature amount of the image data;

a program code for the first storage step of storing correspondence between the image feature amount extracted in the extraction step and the image data in an image feature amount index;

a program code for the second storage step of, when retrieval information used to retrieve image data is added to the image data, storing correspondence between the retrieval information and the image data in a retrieval information index;

a program code for the input step of inputting a retrieval condition for retrieving desired image data;

a program code for the first retrieval step of retrieving image data having retrieval information corresponding to the retrieval condition input in the input step by looking up the retrieval information index;

a program code for the second retrieval step of retrieving image data similar to the image data retrieved in the first retrieval step on the basis of the image feature amount of the image data by looking up the image feature amount index; and a program code for the display step of displaying image data corresponding to the retrieval condition on the basis of the image data retrieved in the first retrieval step and image data retrieved in the second retrieval step.

In summary, according to the present invention, an image processing apparatus and method which allow effective and easy retrieval according to the taste of the user without adding any description or keyword for managing image data can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flow chart showing details of retrieval processing executed in the first embodiment of the present invention;

FIG. 6 is a view showing an example of the user interface in the first embodiment of the present invention;

FIG. 7 is a view showing another example of the user interface in the first embodiment of the present invention;

FIG. 11 is a view showing still another example of the user interface in the first embodiment of the present invention;

FIG. 12 is a view showing still another example of the user interface in the first embodiment of the present invention;

DETAILED DESCRIPTION OF THE PREFERRED EMBODIMENTS

Preferred embodiments of the present invention will be described below in detail with reference to the accompanying drawings.

<First Embodiment>

Figure 1:
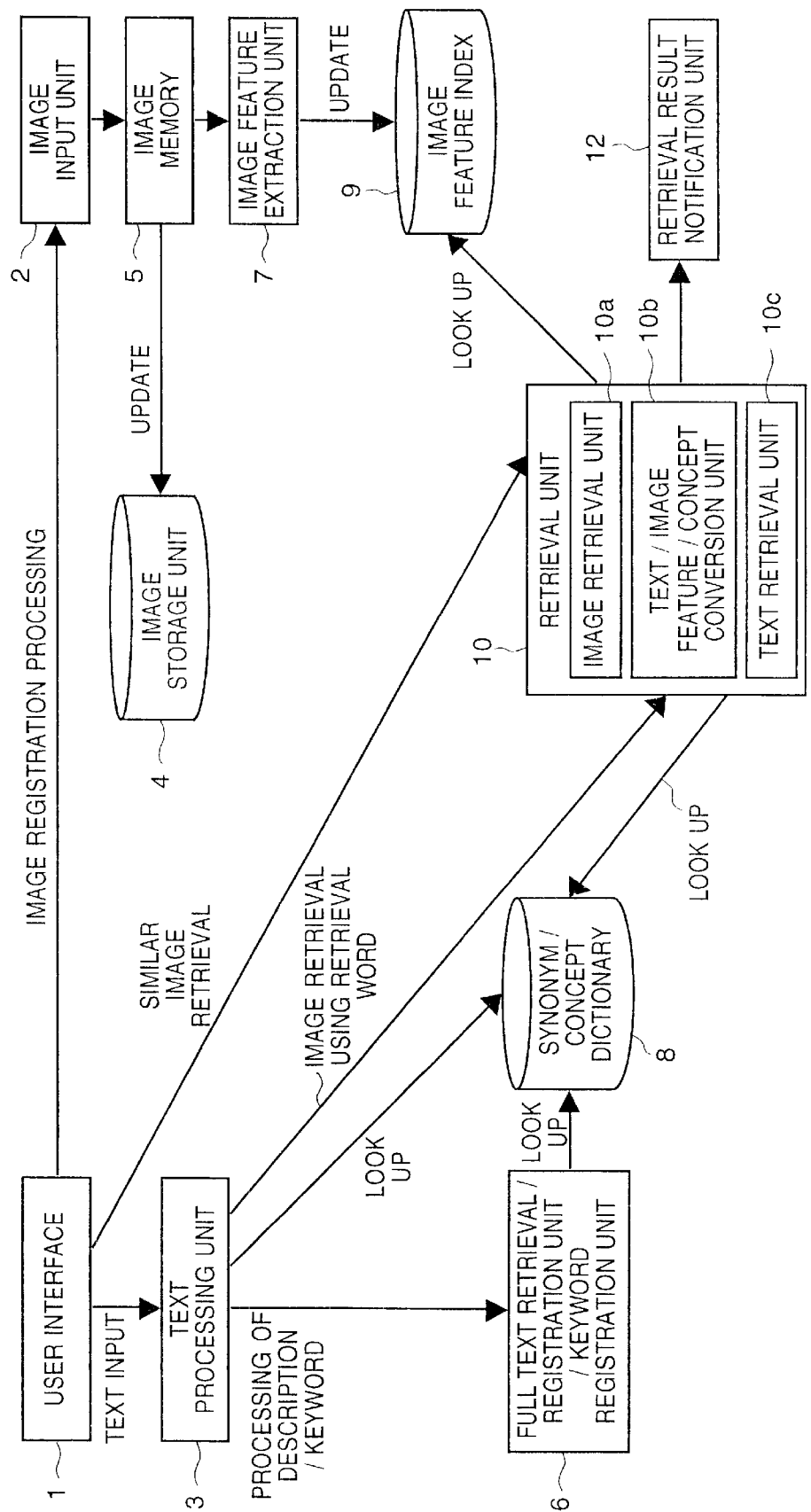
FIG. 1 is a block diagram showing the arrangement of an image processing apparatus according to the first embodiment of the present invention.

FIG. 1 is a block diagram showing the arrangement of an image processing apparatus according to the first embodiment of the present invention.

Referring to FIG. 1, a user interface 1 is constituted by a keyboard or mouse. An image storage unit 4 stores image data temporarily stored in an image memory 5. An image input unit 2 inputs image data to be registered in the image storage unit 4 in accordance with an instruction from the user interface 1.

Image data to be handled in the first embodiment is natural image data. However, the image data is not limited to this, and artificial image data such as CG or CAD data may be processed.

The image memory 5 temporarily stores image data input from the image input unit 2. An image feature extraction unit 7 extracts an image feature amount for retrieving image data similar to image data temporarily stored in the image memory 5. An image feature index 9 registers the image feature amount of image data extracted by the image feature extraction unit 7 in correspondence with the image data.

A text processing unit 3 outputs a retrieval word input from the user interface 1 to a retrieval unit 10.

A full text retrieval/registration unit/keyword registration unit 6 registers a word input from the text processing unit 3 in a synonym/concept dictionary 8. The synonym/concept dictionary 8 manages synonyms in units of concepts corresponding to the synonyms. The word to be managed by the synonym/concept dictionary 8 has an image feature weight representing the effectivity of the word itself for the retrieval word. Details of the synonym/concept dictionary 8 will be described later.

The retrieval unit 10 comprises an image retrieval unit 10a, an text/image feature/concept conversion unit 10b, and a text retrieval unit 10c. The text retrieval unit 10c retrieves a word corresponding to the retrieval word input from the text processing unit 3. The text/image feature/concept conversion unit 10b acquires the image feature weight for the retrieval word with reference to the synonym/concept dictionary 8 and calculates an image feature amount for retrieving image data. The image retrieval unit 10a retrieves image data by looking up the image feature index 9 on the basis of the image feature amount calculated by the text/image feature/concept conversion unit 10b.

A retrieval result notification unit 12 displays image data obtained from the retrieval unit 10 as a retrieval result. The retrieval result notification unit 12 also displays, for the user, a question window for obtaining information usable for retrieval in association with the input retrieval word.

Details of the arrangement of the synonym/concept dictionary 8 of the first embodiment will be described next with reference to FIG. 2.

Figure 2:
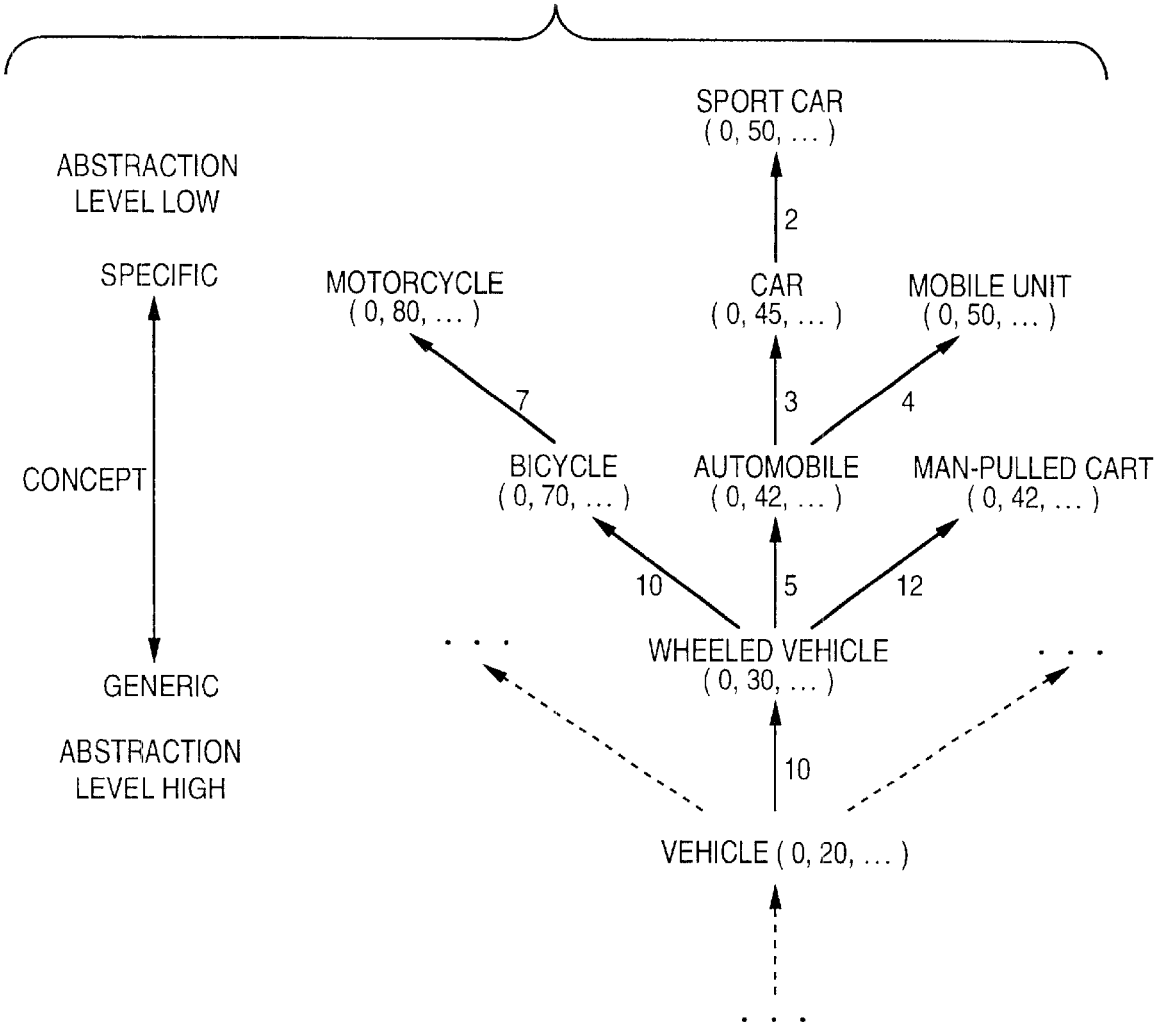
FIG. 2 is a view showing details of the arrangement of a synonym/concept dictionary in the first embodiment of the present invention.

FIG. 2 is a view showing details of the arrangement of the synonym/concept dictionary in the first embodiment of the present invention.

The synonym/concept dictionary 8 registers synonyms on the basis of the abstraction levels of concepts corresponding to the synonyms. For synonyms of different conceptual abstraction levels, a conceptual distance representing the difference in abstraction level is defined. In FIG. 2, the conceptual distance between "vehicle" and "wheeled vehicle" is 10.

In addition, for synonyms, an n-dimensional vector is defined as an image feature amount for weighting each of n image feature amounts of an input retrieval word to reflect its effectivity. The n-dimensional vector is normalized with reference to 100.

For example, an automobile is an artificial object and can have various colors. The weight for an image feature amount associated with colors is 0, so the image feature amount must not be referred to. In this case, retrieval is executed by placing importance on image feature amounts except colors as effective image feature amounts for the retrieval word. However, when the retrieval word is "red wheeled vehicle", information "red" is taken into consideration, so retrieval is executed in consideration of red color as an image feature amount.

Image registration processing executed to register image data in the image processing apparatus of the first embodiment will be described next with reference to FIG. 3.

Figure 3:
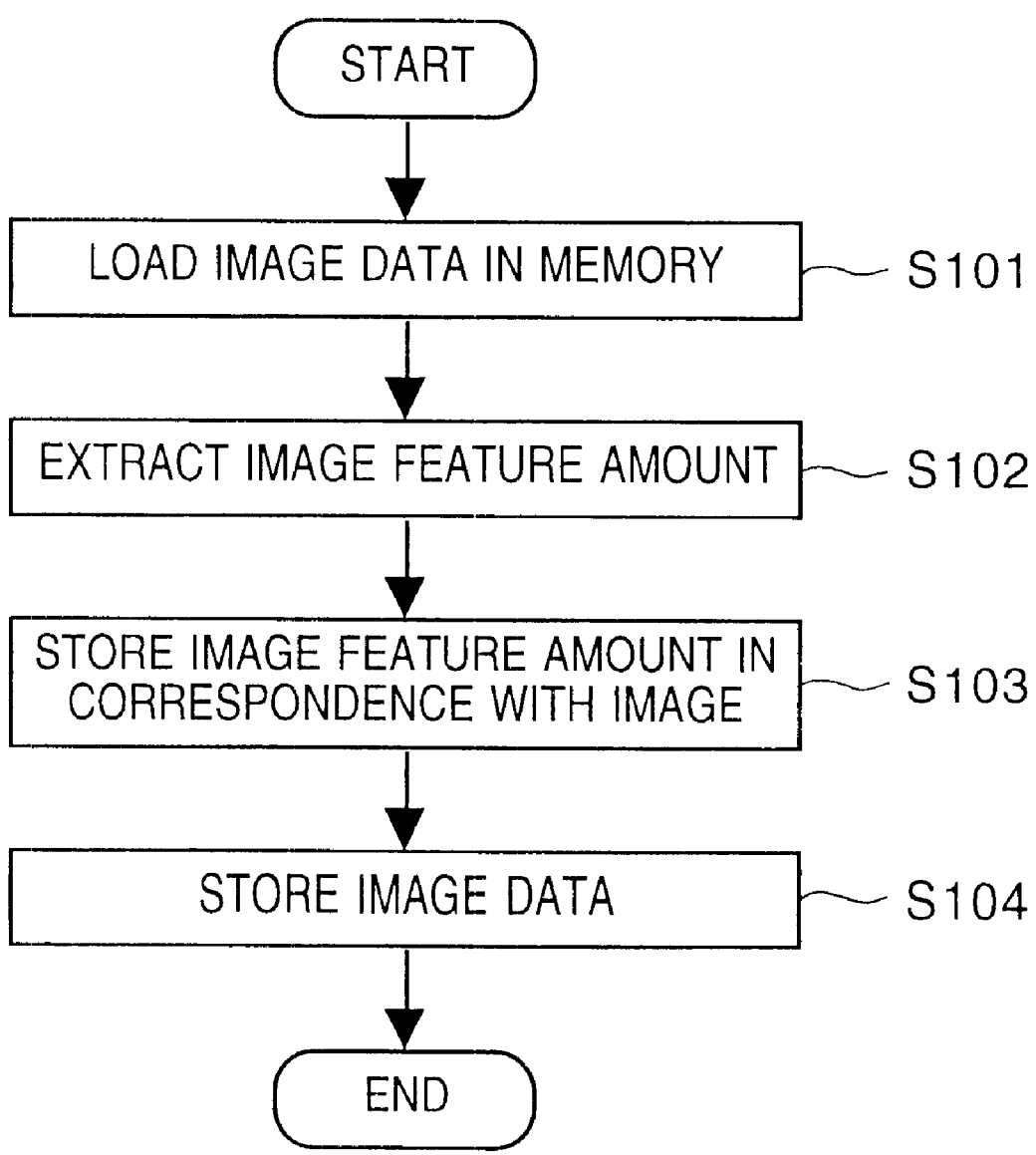
FIG. 3 is a flow chart showing the flow of image registration processing executed in the first embodiment of the present invention.

FIG. 3 is a flow chart showing the flow of image registration processing executed in the first embodiment of the present invention.

In step S101, image data to be registered is input from the image input unit 2, and the input image data is temporarily stored in the image memory 5. In step S102, the image feature amount of the image data is extracted by the image feature extraction unit 7. In step S103, the image feature amount extracted from the image data is registered in the image feature index 9 in correspondence with the image data. In step S104, the image data is stored in the image storage unit 4.

Retrieval processing executed to retrieve image data in the image processing apparatus of the first embodiment will be described next with reference to FIG. 4.

Figure 4:
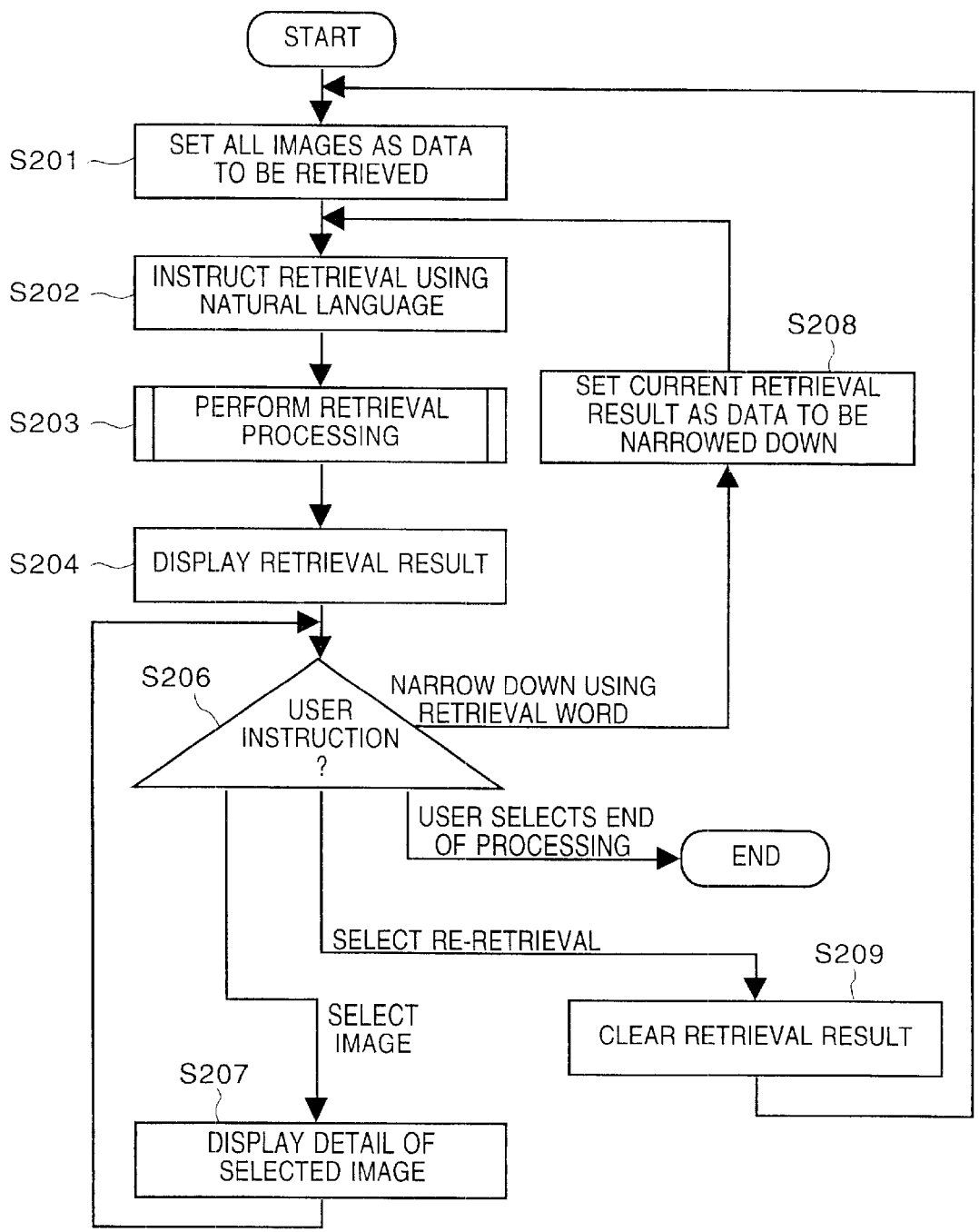
FIG. 4 is a flow chart schematically showing retrieval processing executed in the first embodiment of the present invention.

FIG. 4 is a flow chart schematically showing retrieval processing executed in the first embodiment of the present invention.

In step S201, all image data stored in the image storage unit 4 are set as image data for retrieval. In step S202, a retrieval word using a natural language is input from the user interface 1. In step S203, image data is retrieved on the basis of the input retrieval word. When retrieval is executed, the retrieval result is displayed on the retrieval result notification unit 12 in step S204. In step S205, an instruction from the user for the retrieval result is received.

Details of retrieval in step S203 will be described later with reference to FIG. 5.

If the user instructs to set a new retrieval word to narrow down the retrieval result, a retrieval instruction for further narrowing down the current retrieval result is set from the user interface 1 in step S208. The flow returns to step S202 to input a new retrieval word. In this case, the current retrieval result is held. The retrieval result based on the newly input retrieval word and the held retrieval result are ANDed to narrow down the retrieval result.

If the user instructs to end retrieval processing, processing is ended.

If the user instructs to perform retrieval again, the retrieval result is cleared in step S209, and the flow returns to step S201.

If the user selects one of image data (thumbnail image data) displayed as the retrieval result to instruct display of detail of the desired image data, the detail (full-scale image data) of the selected image data (thumbnail image data) is displayed in step S207.

Details of retrieval in step S203 will be described next with reference to FIG. 5.

FIG. 5 is a flow chart showing details of retrieval processing executed in the first embodiment of the present invention.

In step S301, the morpheme and modification of the input retrieval word using a natural language are analyzed with reference to the synonym/concept dictionary 8 to extract an "retrieval object name" represented by the retrieval word and an outer appearance feature representing the feature of the "retrieval object name". Next, it is determined whether the extracted "retrieval object name" is present in the synonym/concept dictionary 8. If the "retrieval object name" is present in the synonym/concept dictionary 8 (YES in step S302), the flow advances to step S303. If the "retrieval object name" is not present in the synonym/concept dictionary 8 (NO in step S302), the flow advances to step S309. In step S309, the user is asked about an "object name" having a concept closest to the "retrieval object name". The acquired "object name" is set as a "retrieval object name". By processing in step S309, a word having a concept close to the input "retrieval object name" can be extracted. In step S310, the "retrieval object name" set in step S309 is registered in the synonym/concept dictionary 8 as a new "retrieval object name".

Figure 8:
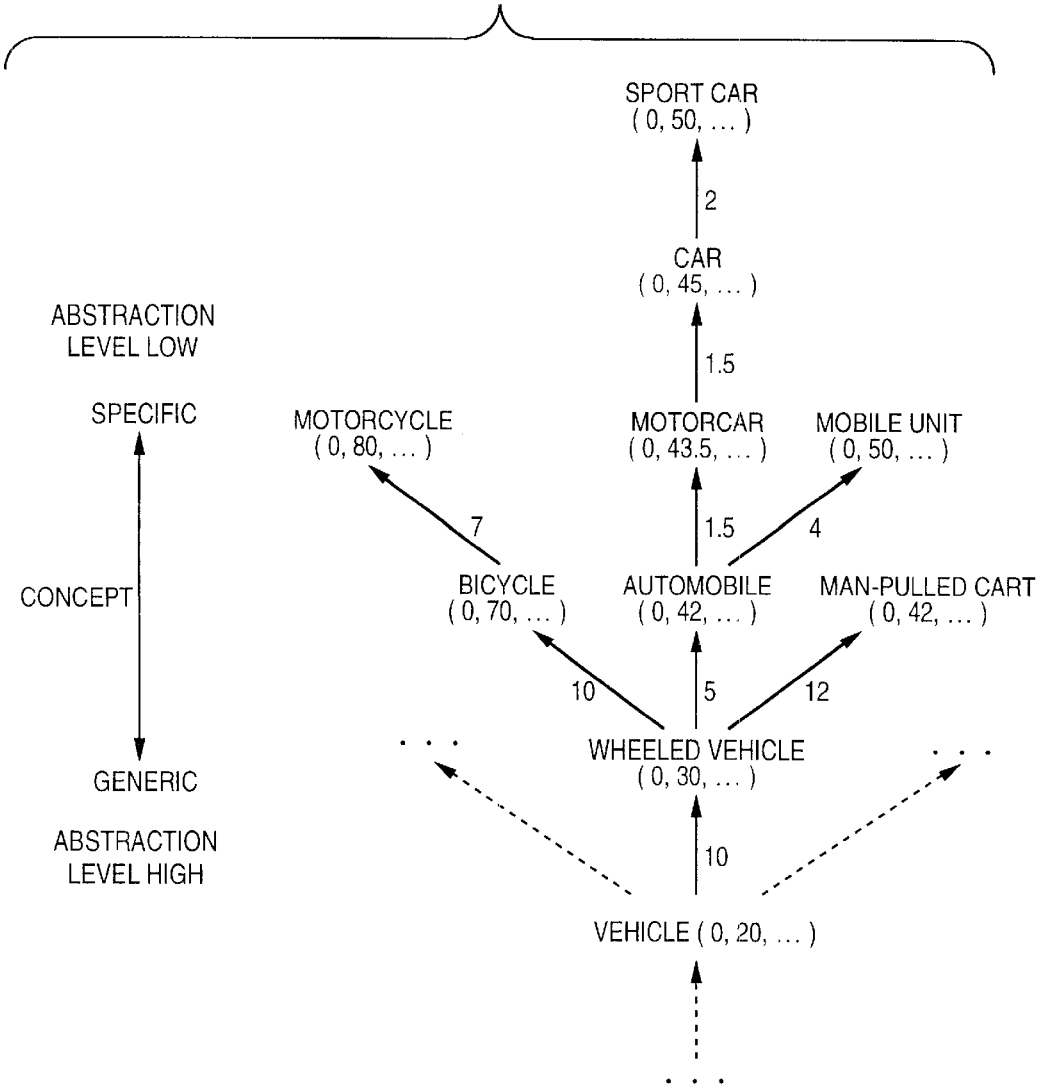
FIG. 8 is a view showing an example of the updated synonym/concept dictionary in the first embodiment of the present invention.

Details of processing in step S309 will be described with reference to FIGS. 6 to 8.

FIG. 6 is a view showing an example of the user interface of the first embodiment of the present invention.

When processing in step S309 is executed, a word input window as shown in FIG. 6 is displayed on the retrieval result notification unit 12. When a word having a concept close to the "retrieval object name" is input using this word input window, a word having a concept close to the input word is displayed. In the example shown in FIG. 6, "motorcar" has been input as a "retrieval object name", and since this word is not registered in the synonym/concept dictionary 8, "automobile" having a close concept is input.

Five buttons, i.e., "back", "forward", "search", "cancel", and "OK" are displayed on the right side of the word input window. By pointing one of the buttons with the cursor displayed on the retrieval result notification unit 12, processing to be described below is executed.

With the "back" button, the currently displayed word input window returns to the previous word input window. The "forward" button is used to display a new word input window. With the "search" button, a word having a concept close to the input word is searched for, and the result is displayed as shown in FIG. 7. The "cancel" button is used to cancel the word input. The "OK" button is used to select a word having a concept close to the "retrieval object name" which is not registered in the synonym/concept dictionary 8. The "retrieval object name" which has not been registered in the synonym/concept dictionary 8 is registered in the synonym/concept dictionary 8 as a new synonym of conceptual level between the conceptual level of the selected word and the next conceptual level.

For example, when "automobile" is selected as a word having a concept close to "motorcar" which has not been registered in the synonym/concept dictionary 8, "motorcar" is registered as a word of a conceptual level between the conceptual level of "automobile" and that of "car". "Motorcar" is registered at a position at which the conceptual distance from "automobile" equals that from "car". In addition, the image feature weight of "motorcar" is prepared on the basis of the image feature weights of "automobile" and "car" and registered.

Refer back to the flow chart shown in FIG. 5.

In step S303, the image feature weight of the "retrieval object name" is acquired from the synonym/concept dictionary 8. If the outer appearance feature of the "retrieval object name" is extracted in step S304, an image feature weight associated with the outer appearance feature is added to the image feature weight acquired in step S303. In step S305, the user is asked about an effective image feature weight for the image feature amount. Details of this processing will be described with reference to the flow chart shown in FIG. 9.

Figure 9:
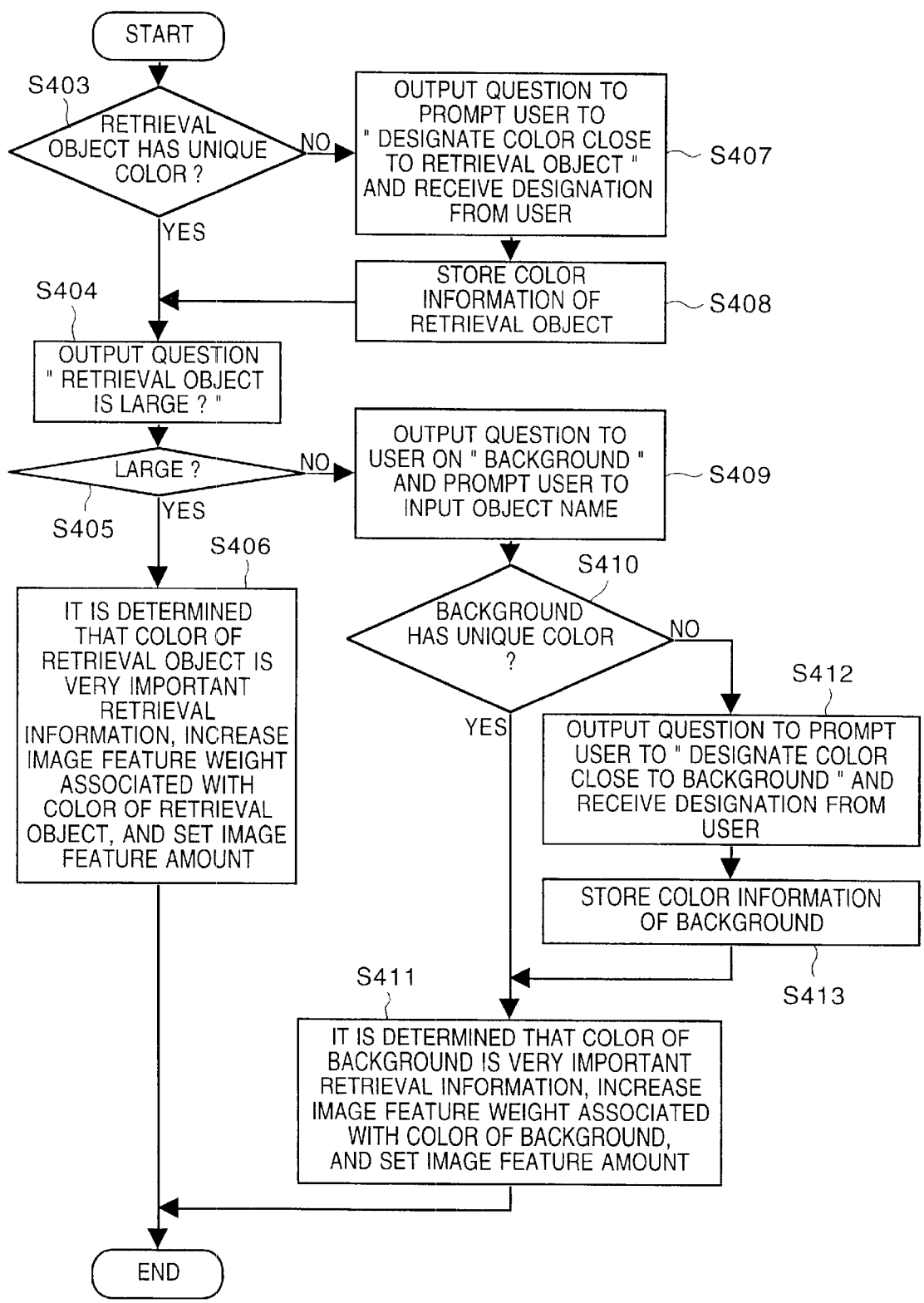
FIG. 9 is a flow chart showing details of processing in step S305 in the first embodiment of the present invention.

FIG. 9 is a flow chart showing details of processing in step S305 of the first embodiment of the present invention.

Processing in FIG. 9 is executed to further obtain effective information (image feature weights) for retrieval, or supplement image feature amounts in retrieval.

Figure 10:
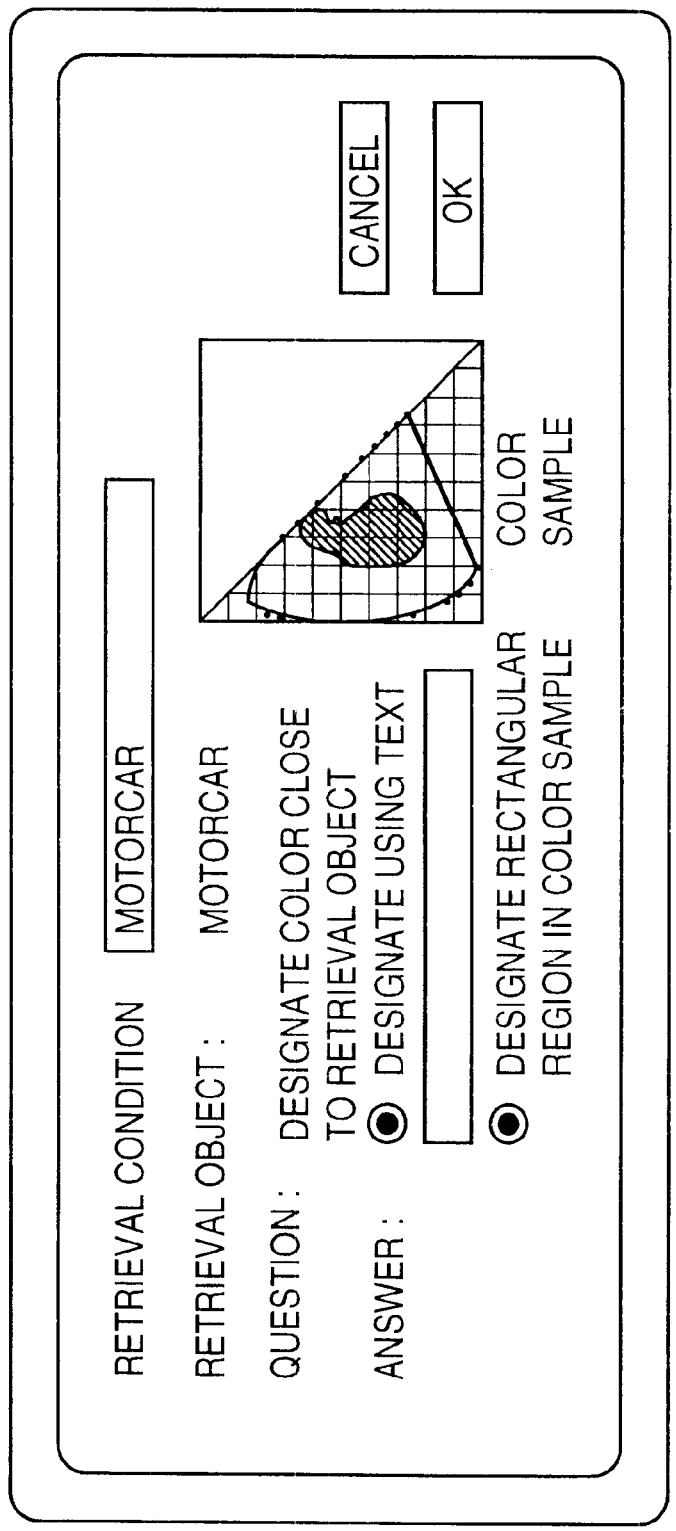
FIG. 10 is a view showing still another example of the user interface in the first embodiment of the present invention.

In step S403, it is determined on the basis of the image feature weight of the acquired "retrieval object name" whether the retrieval object represented by the "retrieval object name" has a unique color. If the retrieval object has a unique color (YES in step S403), the flow advances to step S404. If the color of the retrieval object is not unique (NO in step S403), the flow advances to step S407. In step S407, the user is asked to "designate a color close to the retrieval object" using a question window as shown in FIG. 10, and a designation from the user is received. The color is designated using, e.g., a word or color sample, as shown in FIG. 10. In step S408, the designated color is stored as an image feature weight.

In step S404, the user is asked whether "the size of the retrieval object is large" using a question window as shown in FIG. 11. In step S405, the user selects an answer about the size of the retrieval object represented by the "retrieval object name" using the question window. If the size of the retrieval object is large (YES in step S405), the flow advances to step S406. It is determined in step S406 that the color of the retrieval object represented by the "retrieval object name" is very important retrieval information. The image feature weight associated with the color of the retrieval object is increased, and the image feature amount of the "retrieval object name" is set. If the retrieval object is not large (NO in step S405), the flow advances to step S409.

Figure 13:
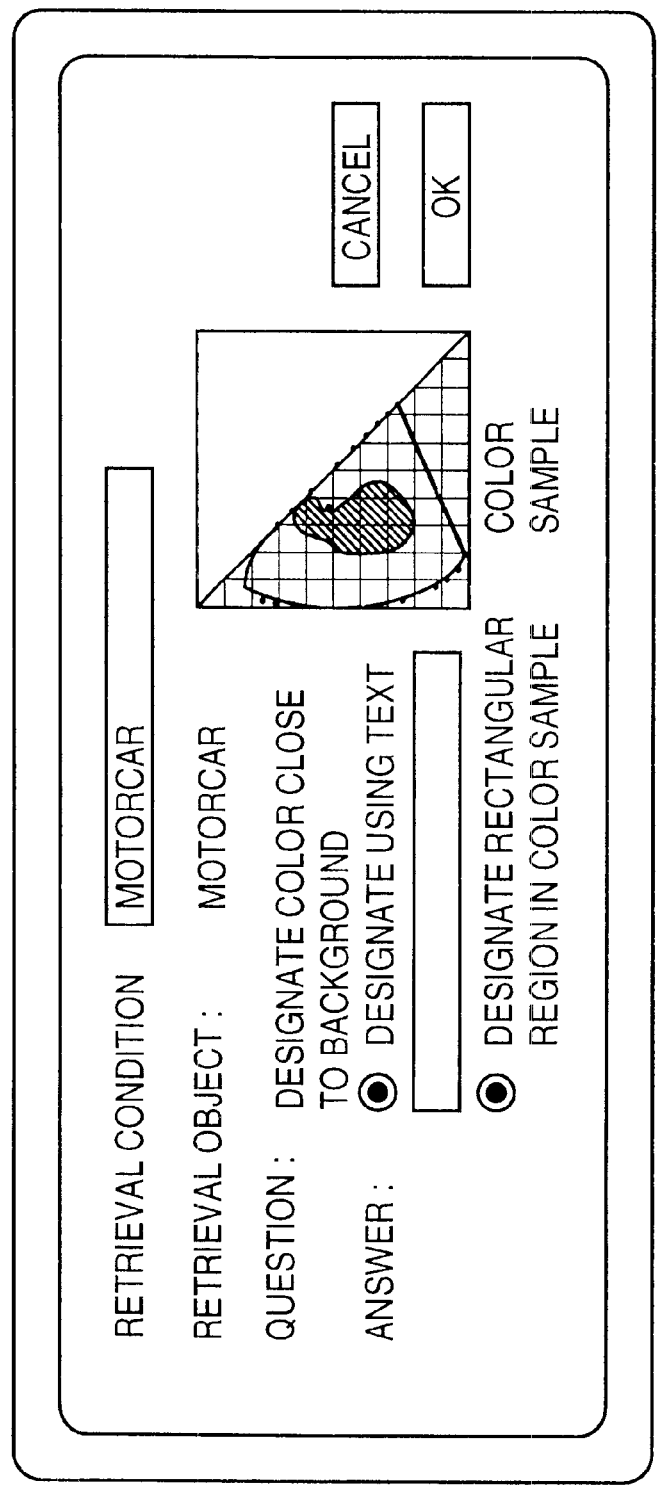
FIG. 13 is a view showing still another example of the user interface in the first embodiment of the present invention.

In step S409, the user is asked about the "background" using a question window as shown in FIG. 12, and the answer from the user is received. The background is designated using, e.g., an object name, as shown in FIG. 12. It is determined in step S410 whether the background has a unique color. If the background has a unique color (YES in step S410), the flow advances to step S411. If the color of the background is not unique (NO in step S410), the flow advances to step S412. In step S412, the user is asked to "designate a color close to the background" using a question window as shown in FIG. 13, and the answer from the user is received. In step S413, the designated color is stored as an image feature weight.

It is determined in step S411 that the color of the background is very important retrieval information. The image feature weight associated with the color of the background is increased, and the image feature amount of the "retrieval object name" is set.

In the above description, information associated with the retrieval object color or background color is designated by the user. However, information associated with the feature of the surface of the retrieval object or other feature may be designated by the user, as a matter of course. With the above arrangement, an image feature weight useful for retrieval using the input retrieval word can be prepared. Retrieval can be executed on the basis of an image feature amount considering the image feature weight, so precise retrieval can be performed.

Refer back to the flow chart in FIG. 5.

In step S306, image data is retrieved on the basis of the image feature amount while looking up the image feature index 9. It is determined in step S307 whether image data to be retrieved is present. If image data to be retrieved is present (YES in step S307), the flow advances to step S308. In step S308, the retrieved image data is displayed on the retrieval result notification unit 12. If image data to be retrieved is not present (NO in step S307), the flow advances to step S312.

It is determined in step S312 whether the user wants to redesignate the image feature amount. If the user wants to redesignate the image feature amount (YES in step S312), the flow advances to step S311. In step S311, the user is asked about an effective image feature weight for the image feature amount. This processing has been described in detail using the flow chart in FIG. 6. If the user does not want to redesignate the image feature amount (NO in step S312), the flow advances to step S313. In step S313, the retrieval result notification unit 12 displays that no retrieved image data is present.

As described above, according to the first embodiment, the outer appearance feature of the retrieval object name represented by the input retrieval word using a natural language can be input, so specific retrieval conditions desired by the user can be input. Even when the input retrieval word has not been registered in the synonym/concept dictionary 8, a word having a concept close to the retrieval word can be input for retrieval. Since the word having a concept close to the retrieval word can be newly registered in the synonym/concept dictionary 8, the synonym/concept dictionary 8 according to taste of the user can be generated.

The user can retrieve desired image data only by inputting retrieval conditions without adding any keywords. The synonym/concept dictionary 8 can learn an unknown word such as a newly coined word through an interactive interface to the user and be updated. Therefore, the retrieval range can be widened in accordance with the need of the time to realize retrieval according to taste of the user.

In the first embodiment, retrieval of natural image data has been described. However, the gist of the present invention can be applied to information retrieval from information media in various forms.

In addition, retrieval based on the description or keyword added to image data may be performed simultaneously with the above-described processing, and the user may be notified of the integrated retrieval result, although this has not been described in the first embodiment.

<Second Embodiment>

Figure 14:
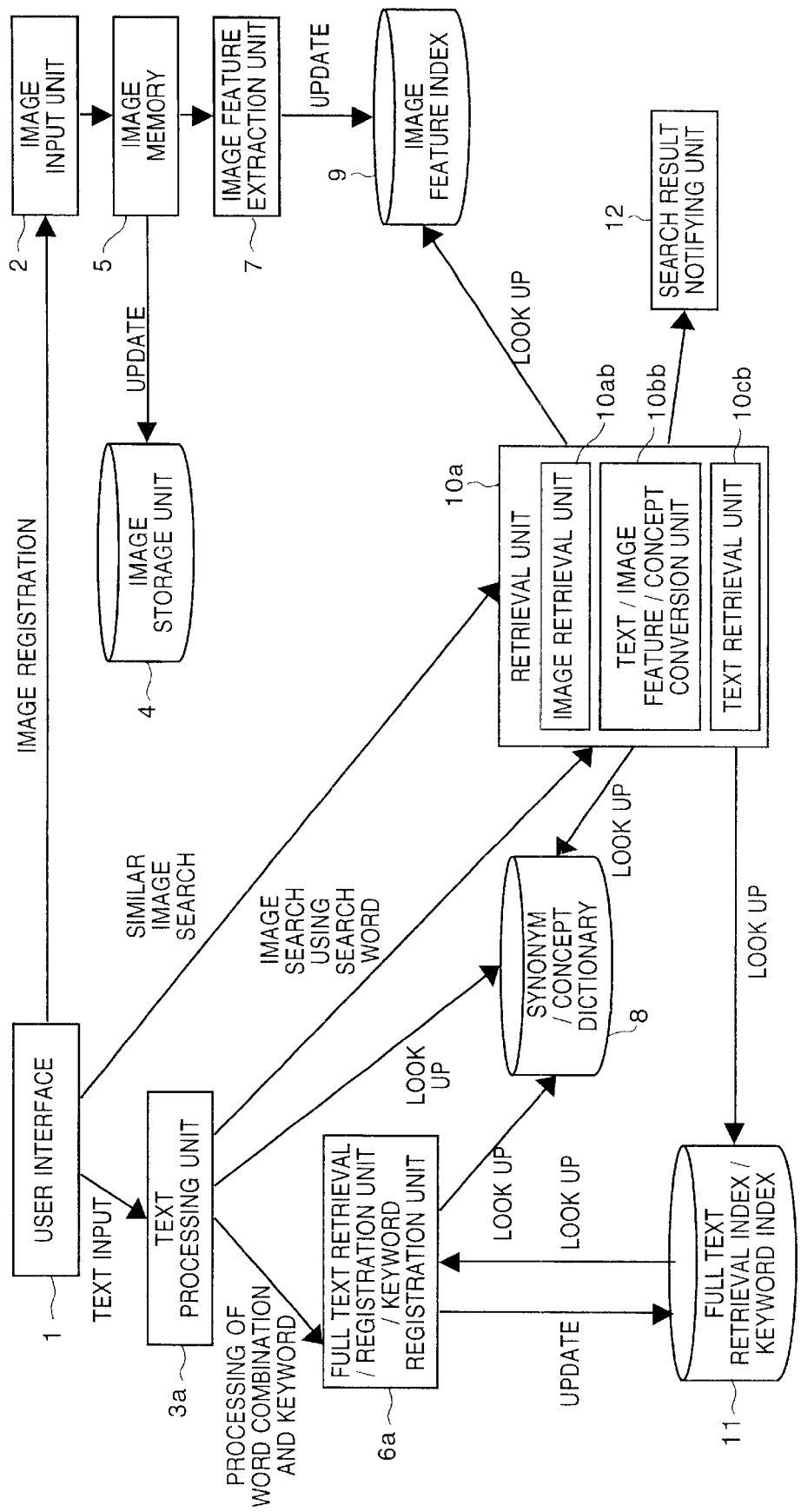
FIG. 14 is a block diagram showing the arrangement of an image processing apparatus according to the second embodiment of the present invention.

FIG. 14 is a block diagram showing the arrangement of an image processing apparatus according to the second embodiment of the present invention.

The same reference numerals as in the first embodiment denote the same constituent elements in the second embodiment, and a detailed description thereof will be omitted.

Referring to FIG. 14, when image data input from an image input unit 2 has a description and keyword representing the contents of the image data, a text processing unit 3a analyzes the morpheme of the description or keyword by looking up a synonym/concept dictionary 8 and outputs a word obtained from the analysis result to a full text retrieval/registration unit/keyword registration unit 6a. When a retrieval word for retrieving image data stored in an image storage unit 4 is input from a user interface 1, the text processing unit 3a outputs the retrieval word to an image retrieval unit 10.

The full text retrieval/registration unit/keyword registration unit 6a registers a word input from the text processing unit 3a in a full text retrieval index/keyword index 11 in correspondence with input image data.

A retrieval unit 10a comprises an image retrieval unit 10ab, a text/image feature/concept conversion unit 10bb, and a text retrieval unit 10cb. The text retrieval unit 10cb performs full text retrieval/keyword retrieval on the basis of the retrieval word input from the text processing unit 3a while looking up the full text retrieval index/keyword index 11. The text/image feature/concept conversion unit 10bb acquires an image feature weight for the retrieval word by looking up the synonym/concept dictionary 8 and calculates an image feature amount for retrieving image data similar to the image data retrieved by the text retrieval unit 10cb. The image retrieval unit 10ab retrieves similar image data on the basis of the image feature amount calculated by the text/image feature/concept conversion unit 10bb while looking up an image feature index 9. The image retrieval unit 10ab also retrieves similar image data on the basis of the image feature amount of one of image data as the retrieval result displayed on a retrieval result notification unit 12, which is designated from a user interface 1, by looking up the image feature index 9.

Image registration processing executed to register image data in the image processing apparatus of the second embodiment will be described next with reference to FIG. 15.

Figure 15:
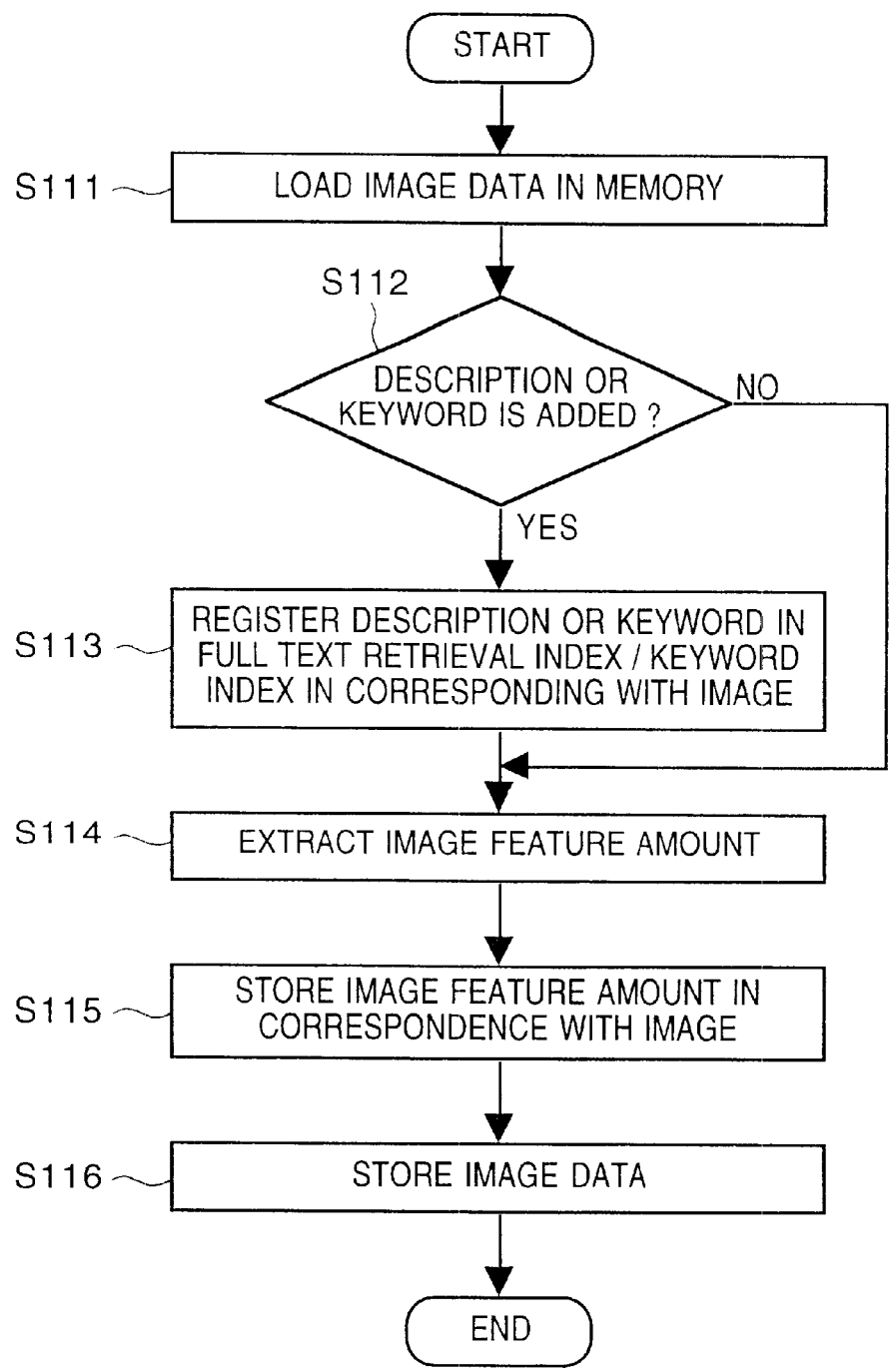
FIG. 15 is a flow chart showing the flow of image registration processing executed in the second embodiment of the present invention.

FIG. 15 is a flow chart showing the flow of image registration processing executed in the second embodiment of the present invention.

First, in step S111, image data for registration is input from the image input unit 2. The input image data is temporarily stored in an image memory 5. It is determined in step S112 whether the input image data has a description or keyword of the input image data. If the image data has neither description nor keyword (NO in step S112), the flow advances to step S114. If the image data has a description or keyword (YES in step S112), the flow advances to step S113.

In step S113, the description or keyword added to the image data is registered in the full text retrieval index/keyword index 11 in correspondence with the image data. In step S114, the image feature amount of the image data is extracted by an image feature extraction unit 7. In step S115, the image feature amount extracted from the image data is registered in the image feature index 9 in correspondence with the image data. In step S116, the image data is stored in the image storage unit 4.

When a plurality of typical and high-quality representative image data which are likely to be frequently retrieved (image data to be retrieved at a frequency larger than a predetermined value) are to be registered in initial installation, descriptions or keywords representing the contents of the representative image data are added. The added descriptions or keywords are registered in the full text retrieval index/keyword index ll in correspondence with the representative image data. To retrieve similar image data, the image feature amounts of the representative image data are extracted and registered in the image feature index 9.

Retrieval processing executed to retrieve image data in the image processing apparatus of the second embodiment will be described next with reference to FIGS. 16 and 17.

Figure 16:
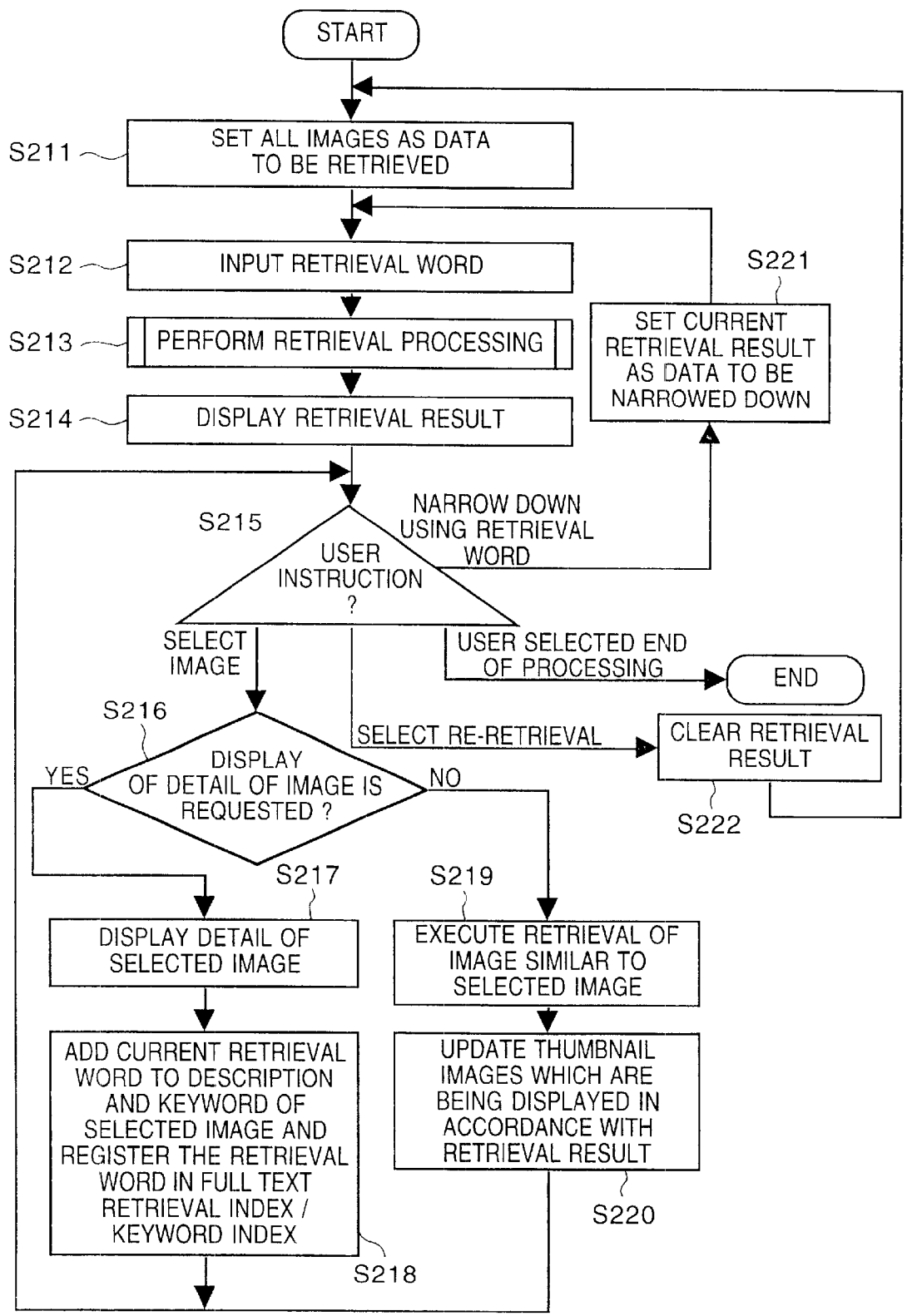
FIG. 16 is a flow chart schematically showing retrieval processing executed in the second embodiment of the present invention.

First, the retrieval processing will be briefly described using FIG. 16.

FIG. 16 is a flow chart schematically showing retrieval processing executed in the second embodiment of the present invention.

In step S211, all image data stored in the image storage unit 4 are set as image data to be retrieved. In step S212, a "retrieval word" as a retrieval condition is input from the user interface 1. In step S213, retrieval processing (full text retrieval/keyword retrieval) is performed on the basis of the input "retrieval word" which is used as a description or keyword. Details of this retrieval processing will be described below with reference to FIG. 17.

Figure 17:
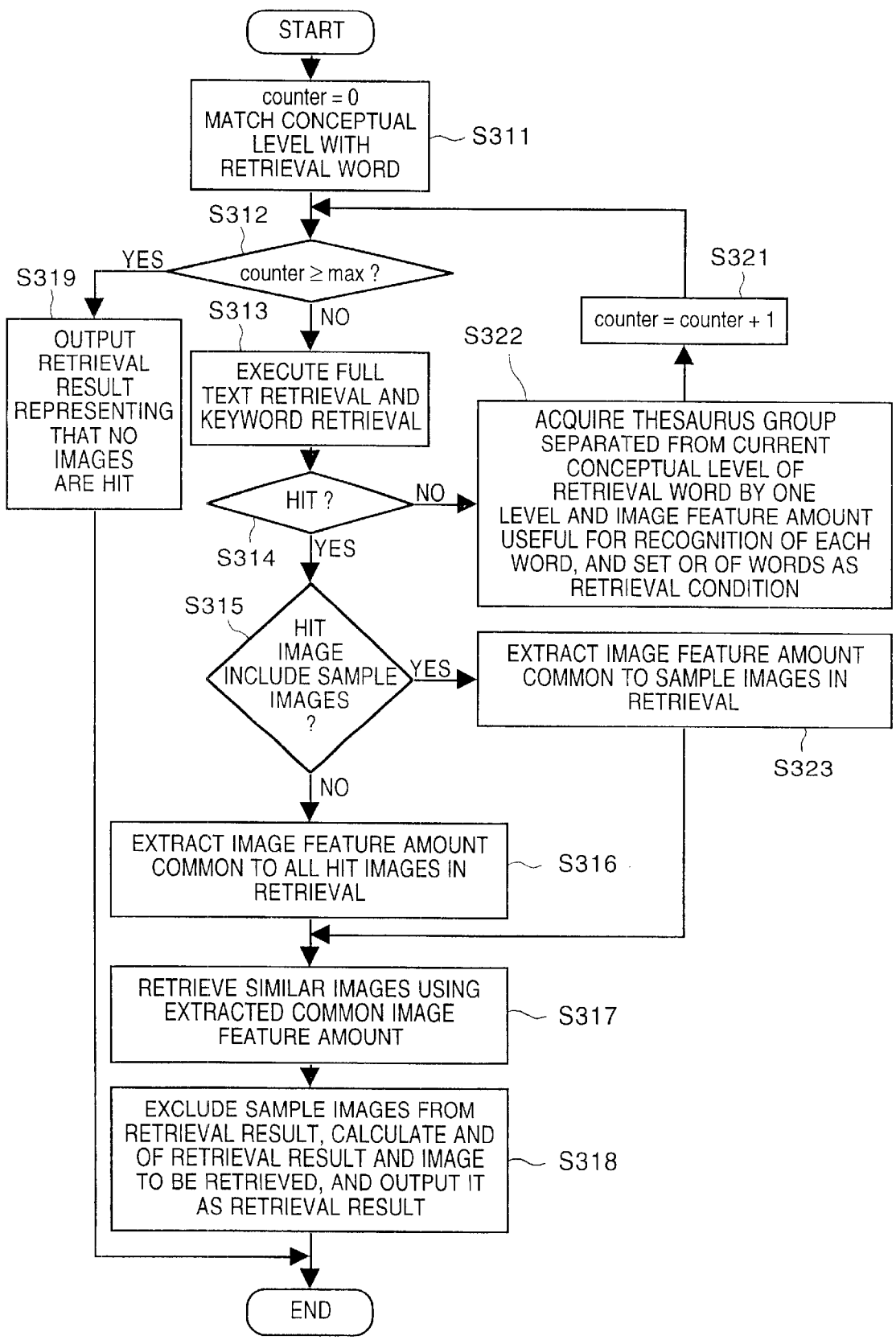
FIG. 17 is a flow chart showing details of retrieval processing executed in the second embodiment of the present invention.

FIG. 17 is a flow chart showing details of retrieval processing executed in the second embodiment of the present invention.

In step S311, "0" is set in a counter (not shown), and the conceptual level of the retrieval word is made to match the currently set conceptual level of the synonym/concept dictionary 8. It is determined in step S312 whether the content of the counter is equal to or larger than a predetermined value max. If the counter content is equal to or larger than the predetermined value max (YES in step S312), the flow advances to step S319. In step S319, a retrieval result notification unit 12 outputs a message representing that no corresponding image data has been retrieved. When the counter content is smaller than the predetermined value max (NO in step S312), the flow advances to step S313.

In step S313, full text retrieval/keyword retrieval based on the retrieval word is executed. It is determined in step S314 whether image data to be retrieved is present. If no image data to be retrieved is present (NO in step S314), the flow advances to step S322. If image data to be retrieved is present (YES in step S314), the flow advances to step S315.

It is determined in step S315 whether the retrieved image data include representative image data. If representative image data are included (YES in step S315), the flow advances to step S323. In step S323, an optimum image feature weight for the retrieval word is extracted by looking up the synonym/concept dictionary 8. Taking the extracted image feature weight of the retrieval word into consideration, the common image feature amount of the representative image data or a significant image feature amount based on the principle of majority rule is extracted. If no representative image data are included (NO in step S315), the flow advances to step S316. In step S316, an optimum image feature weight for the retrieval word is extracted by looking up the synonym/concept dictionary 8. Taking the extracted image feature weight of the retrieval word into consideration, the common image feature amount of the retrieved image data or a significant image feature amount based on the principle of majority rule is extracted.

In step S317, image data similar to the retrieved image data are retrieved on the basis of the extracted image feature amount by looking up the image feature index 9. In step S318, the representative image data are excluded from the retrieved similar image data. The similar image data retrieved in step S317 and the image data retrieved in step S313 are ANDed, and the resultant image data are output to the retrieval result notification unit 12 as a retrieval result.

The retrieved image data and similar image data are displayed as thumbnail images.

If it is determined in step S314 that no image data are to be retrieved, in step S322, a synonym of conceptual level next to the retrieval word is acquired by looking up the synonym/concept dictionary 8, and set as a new retrieval condition. If there are a plurality of synonyms, the OR of these synonyms is set as a new retrieval condition. In step S321, the counter content is incremented by one, and the flow returns to step S312.

If image data to be retrieved by full text retrieval/keyword retrieval based on a retrieval word "automobile" are not present, full text retrieval/keyword retrieval is performed using, as a retrieval word, each of "wheeled vehicle", "car", and "mobile unit" of conceptual levels next to that of "automobile" in the synonym/concept dictionary 8. If no image data have been retrieved yet, full text retrieval/ keyword retrieval is performed again using, as a retrieval word, each of "sport car" and "vehicle" of conceptual levels next to that of "automobile". If no image data have been retrieved yet, a word having no generic/specific concept relationship, or a word separated from the conceptual level of the retrieval word by, e.g., three levels is acquired.

The predetermined value max is determined on the basis of the number of times the processing is repeated in steps S322 to S320 and can be arbitrarily set from the user interface 1. The user can infer the precision of the retrieval result on the basis of the predetermined value max. Normally, as the predetermined value max becomes smaller, a more precise retrieval result is obtained. In addition, a retrieval result corresponding to each conceptual level can be obtained.

Refer back to the flow chart shown in FIG. 16.

When retrieval processing is executed in step S213, the retrieval result is displayed on the retrieval result notification unit 12 in step S214. In step S215, an instruction for the retrieval result is received from the user.

If the user instructs to set a new retrieval word to narrow down the retrieval result, retrieval instruction for further narrowing down the current retrieval result is set from the user interface 1 in step S221. The flow returns to step S212 to input a new retrieval word. In this case, the current retrieval result is held. The retrieval result based on the newly input retrieval word and the held retrieval result are ANDed to narrow down the retrieval result.

If the user instructs to end retrieval processing, processing is ended.

If the user instructs to perform retrieval again, the retrieval result is cleared in step S222, and the flow returns to step S211.

If the user selects one of image data (thumbnail image data) displayed as the retrieval result to execute processing for the desired image data, it is determined in step S216 whether the processing for the selected image data is a request for displaying the detail of the image data (full-scale image data). If display of the detail of the selected image data is requested (YES in step S216), the flow advances to step S217 to display the detail (full-scale image data) of the selected image data (thumbnail image data). In step S218, the retrieval word is registered in the full text retrieval index/keyword index 11 in correspondence with the image data as a new description or keyword of the selected image data.

When the detail of the selected image data is to be displayed, the image data is handled as image data corresponding to the retrieval word. The retrieval word is automatically additionally registered in the full text retrieval index/keyword index 11 as the description or keyword of the image data. That is, the image processing apparatus has a function of automatically additionally registering an input retrieval word in the full text retrieval index/keyword index 11 as a description or keyword. Consequently, the descriptions or keywords of image data to be retrieved except representative image data in initial installation are also registered in the full text retrieval index/keyword index 11, so the contents of the full text retrieval index/keyword index 11 can be enriched. If retrieval using the same retrieval word is to be performed, high-speed retrieval can be performed because the retrieval word has already been registered in the full text retrieval index/keyword index 11.

If display of the detail of the selected image data is not requested in step S216 (NO in step S216), the flow advances to step S219 to retrieve image data similar to the selected image data. In step S220, display of current thumbnail image data is updated in accordance with the retrieved similar image data.

When image data similar to the selected image data are to be retrieved, similar image data are retrieved on the basis of the image feature amount of the image data by looking up the image feature index 9. When similar image data close to the image data desired by the user are obtained by this processing, retrieval narrowing down in step S221 becomes more effective.

As described above, according to the second embodiment, image data desired by the user can be easily retrieved without adding any description or keyword for managing image data.

<Third Embodiment>

The third embodiment is an application example of retrieval processing shown in FIG. 17 in the second embodiment. In the second embodiment, retrieval processing is performed using the conceptual level of the synonym/concept dictionary 8. However, in the third embodiment, the conceptual distance of a synonym/concept dictionary 8 is used to perform retrieval processing.

Details of retrieval processing executed in the third embodiment will be described below with reference to FIG. 18.

Figure 18:
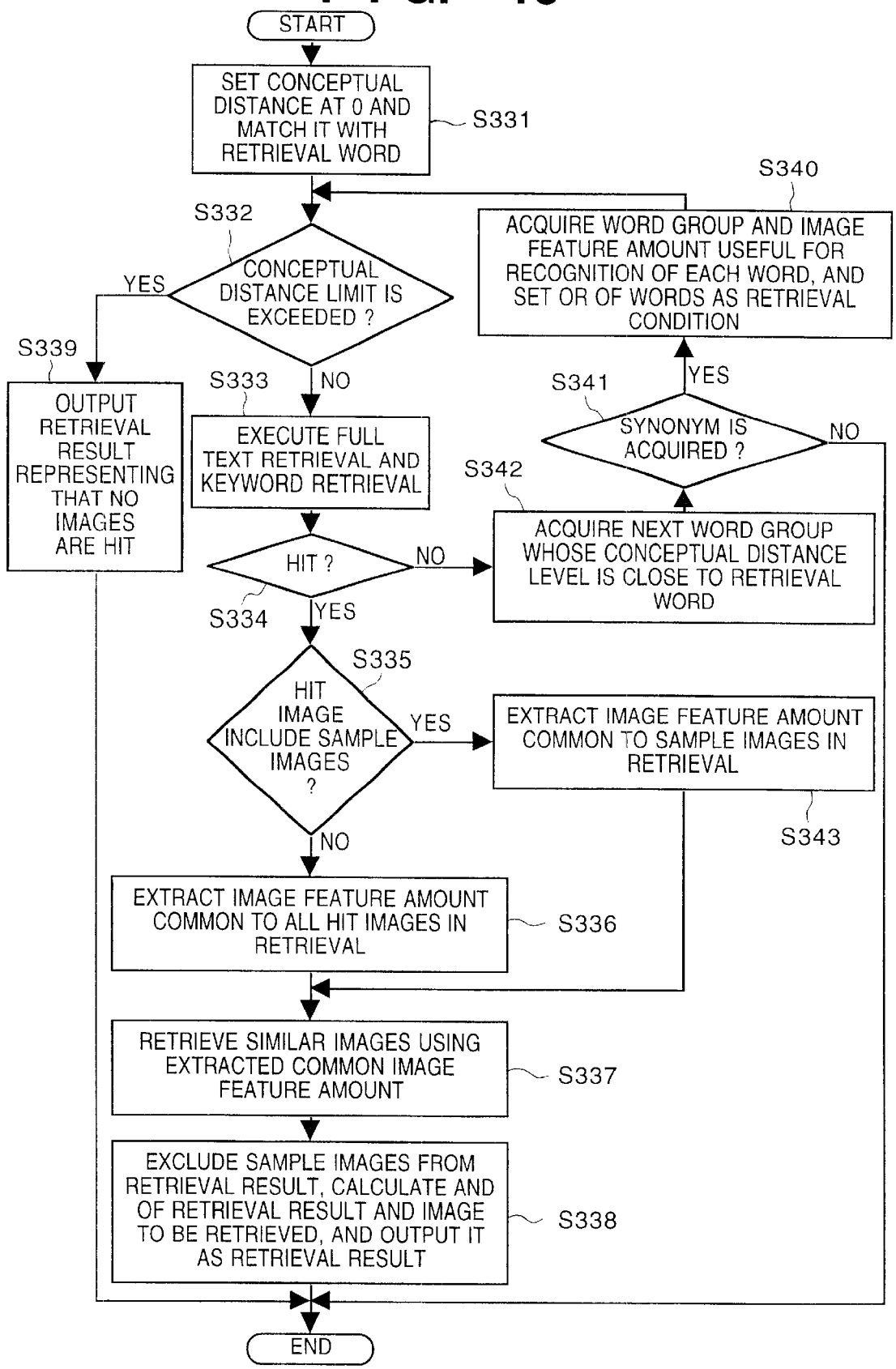
FIG. 18 is a flow chart showing details of retrieval processing executed in the third embodiment of the present invention.

FIG. 18 is a flow chart showing details of retrieval processing executed in the third embodiment of the present invention.

In step S331, the conceptual distance between the concept represented by a retrieval word and the currently set concept of the synonym/concept dictionary 8 is set at 0, and the concept of the retrieval word is made to match the currently set concept of the synonym/concept dictionary 8. It is determined in step S332 whether the conceptual distance exceeds the limit for continuing retrieval. If the conceptual distance exceeds the limit (YES in step S332), the flow advances to step S339. In step S339, a retrieval result notification unit 12 outputs a message representing that no corresponding image data has been retrieved. If the conceptual distance does not exceed the limit (NO in step S332), the flow advances to step S333.

In step S333, full text retrieval/keyword retrieval based on the retrieval word is executed. It is determined in step S334 whether image data to be retrieved are present. If no image data are to be retrieved (NO in step S334), the flow advances to step S342. If image data to be retrieved are present (YES in step S334), the flow advances to step S335.

It is determined in step S335 whether retrieved image data include representative image data. If representative image data are included (YES in step S335), the flow advances to step S343. In step S343, an optimum image feature weight for the retrieval word is extracted by looking up the synonym/concept dictionary 8. Taking the extracted image feature weight of the retrieval word into consideration, the common image feature amount of the representative image data or a significant image feature amount based on the principle of majority rule is extracted. If no representative image data are included (NO in step S335), the flow advances to step S336. In step S336, an optimum image feature weight for the retrieval word is extracted by looking up the synonym/concept dictionary 8. Taking the extracted image feature weight of the retrieval word into consideration, the common image feature amount of the retrieved image data or a significant image feature amount based on the principle of majority rule is extracted. When the retrieval word contains specific information representing an image feature amount, the image feature amount is also extracted as an image feature amount.

In step S337, image data similar to the retrieved image data are retrieved on the basis of the extracted image feature amount by looking up an image feature index 9. In step S338, the representative image data are excluded from the retrieved similar image data. The similar image data retrieved in step S337 and the image data retrieved in step S333 are ANDed, and the resultant image data are output to the retrieval result notification unit 12 as a retrieval result.

The retrieved image data and similar image data are displayed as thumbnail images.

If no image data are to be retrieved in step S334, the flow advances to step S342 to acquire a synonym having a concept next to the concept of the retrieval word by looking up the synonym/concept dictionary 8. It is determined in step S341 whether a synonym has been acquired. If no synonym has been acquired (NO in step S341), processing is ended. If a synonym has been acquired (YES in step S341), the flow advances to step S340.

In step S340, a synonym group having generic and specific concepts closest to the retrieval word is acquired while calculating the sum of conceptual distances within a predetermined conceptual distance from the concept of the retrieval word. The OR of the acquired synonyms is set as a new retrieval condition, and the flow returns to step S332.

For example, when image data to be retrieved by full text retrieval/keyword retrieval using a retrieval word "automobile" is not present, "car" which is closest to "automobile" and has a conceptual distance of 3 from "automobile" in the synonym/concept dictionary 8 is set at a retrieval word, and full text retrieval/keyword retrieval is performed again. If no image data have been retrieved yet, "mobile unit" which is close to "automobile" next to "car" and has a conceptual distance of 4 is used as a retrieval word, and full text retrieval/keyword retrieval is performed again. If no image data have been retrieved yet, the OR of "wheeled vehicle" and "sport car" both of which have a conceptual distance of 5 from "automobile" is set as a retrieval word, and full text retrieval/keyword retrieval is performed again. If no image data have been retrieved yet, a word having no generic/specific concept relationship, a word for which the sum of the conceptual distance from the concept of the retrieval word is limited, or three words having similar conceptual distance sums are acquired.

If no image data have been retrieved under the retrieval condition which has been newly set by processing in steps S342 to S340, synonyms having farther generic and specific concepts are acquired, and processing in steps S342 to S340 is repeated. The retrieval precision may lower or system runaway may occur depending on the number of times the retrieval is repeated. For this reason, in step S332, the conceptual distance limit for limiting the number of times the retrieval is repeated in steps S342 to S340 is set. Not the conceptual distance but the number of times the retrieval is repeated in steps S342 to S340 may be limited.

As described above, according to the third embodiment, image data desired by the user can be easily retrieved without adding any description or keyword for managing image data.

The present invention may be applied to a system constituted by a plurality of devices (e.g., a host computer, an interface device, a reader, a printer, and the like) or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes, as a matter of course.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes, as a matter of course.

Figure 19:
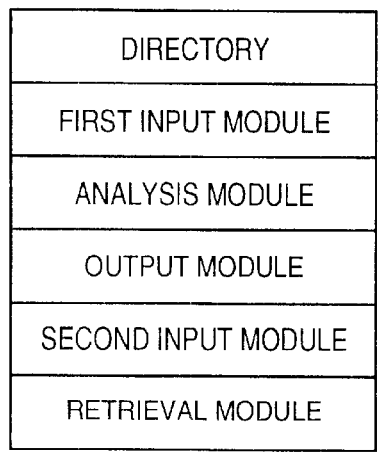
FIG. 19 is a view showing the memory map structure of a storage medium storing a program code for realizing the first embodiment of the present invention.

When the first embodiment of the present invention is applied to the storage medium, program codes corresponding to the above-described flow charts are stored in the storage medium. That is, modules shown in the memory map of FIG. 19 are stored in the storage medium.

More specifically, at least program codes for a "first input module", an "analysis module", an "output module", a "second input module", and a "retrieval module" may be stored in the storage medium.

The "first module" inputs the first retrieval condition for retrieving desired image data. The "analysis module" analyzes the input retrieval condition. The "output module" outputs a question on the basis of the analysis result to prompt the user to inputs the second retrieval condition different from the first retrieval condition. The "second input module" inputs the second retrieval condition in accordance with the output question. The "retrieval module" retrieves image data on the basis of the first and second retrieval conditions.

Figure 20:
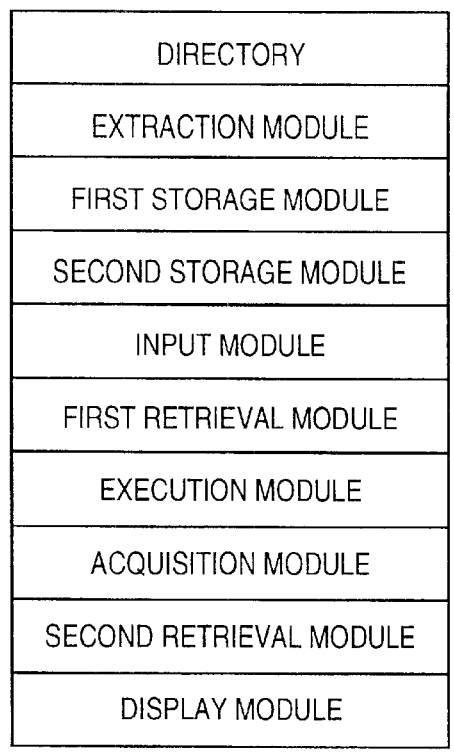
FIG. 20 is a view showing the memory map structure of a storage medium storing a program code for realizing the second embodiment of the present invention.

When the second embodiment of the present invention is applied to the storage medium, program codes corresponding to the above-described flow charts are stored in the storage medium. That is, modules shown in the memory map of FIG. 20 are stored in the storage medium.

More specifically, at least program codes corresponding to an "extraction module", a "first storage module", a "second storage module", an "input module", a "first retrieval module", an "execution module", an "acquisition module", a "second retrieval module", and a "display module" may be stored in the storage medium.

The "extraction module" extracts the image feature amount of image data. The "first storage module" stores correspondence between the extracted image feature amount and the image data in the image feature amount index. When retrieval information used to retrieve image data is added to the image data, the "second storage module" stores correspondence between the retrieval information and the image data in the retrieval information index. The "input module" inputs a retrieval condition for retrieving desired image data. The "first retrieval module" retrieves image data having retrieval information corresponding to the input retrieval condition by looking up the retrieval information index. The "execution module" sets a new retrieval condition in accordance with the retrieval result and repeatedly executes retrieval. The "acquisition module" monitors the number of times the retrieval is executed and acquires retrieved image data in accordance with the monitor result. The "second retrieval module" retrieves image data similar to the acquired image data on the basis of the image feature amount of the image data by looking up the image feature amount index. The "display module" displays image data corresponding to the retrieval condition on the basis of the acquired image data and retrieved image data.

Figure 21:
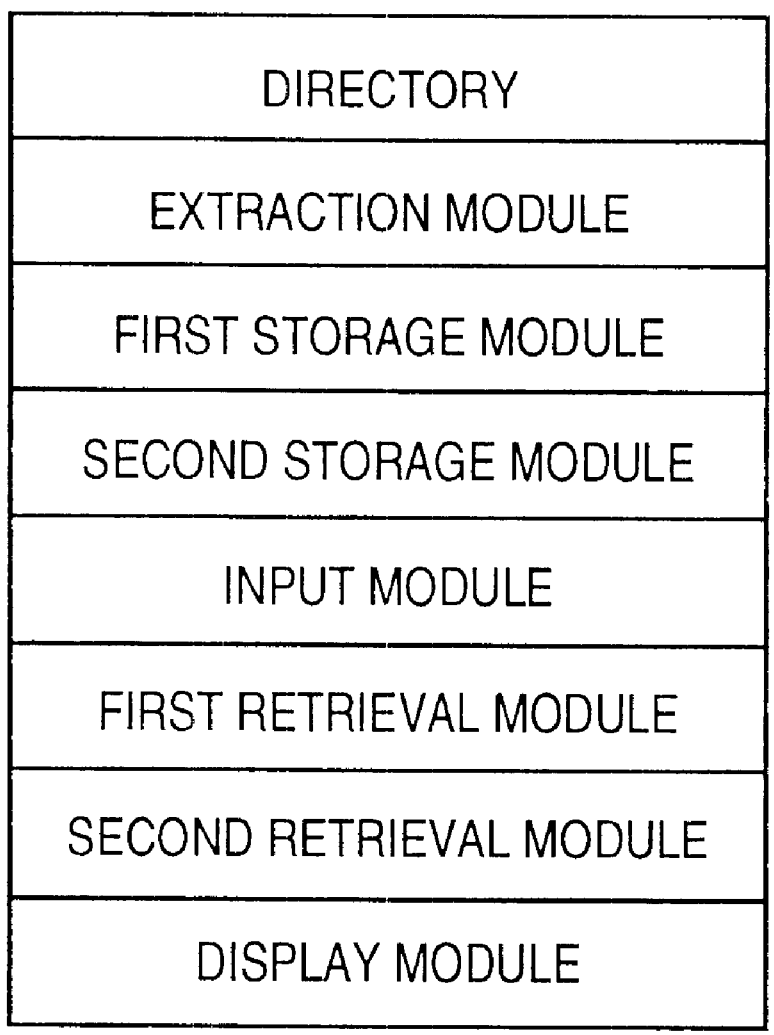
FIG. 21 is a view showing the memory map structure of a storage medium storing a program code for realizing the third embodiment of the present invention.

When the third embodiment of the present invention is applied to the storage medium, program codes corresponding to the above-described flow charts are stored in the storage medium. That is, modules shown in the memory map of FIG. 21 are stored in the storage medium.

More specifically, at least program codes corresponding to an "extraction module", a "first storage module", a "second storage module", an "input module", a "first retrieval module", a "second retrieval module", and a "display module" may be stored in the storage medium.

The "extraction module" extracts the image feature amount of image data. The "first storage module" stores correspondence between the extracted image feature amount and the image data in the image feature amount index. When retrieval information used to retrieve image data is added to the image data, the "second storage module" stores correspondence between the retrieval information and the image data in the retrieval information index. The "input module" inputs a retrieval condition for retrieving desired image data. The "first retrieval module" retrieves image data having retrieval information corresponding to the input retrieval condition by looking up the retrieval information index. The "second retrieval module" retrieves image data similar to the retrieved image data on the basis of the image feature amount of the image data by looking up the image feature amount index. The "display module" displays image data corresponding to the retrieval condition on the basis of the retrieved image data and image data retrieved by the second retrieval means.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for managing image data, comprising:

first input means for inputting a first retrieval condition for retrieving desired image data;

analysis means for analyzing the retrieval condition inputted by said first input means;

output means for outputting a question based on an analysis result from said analysis means to prompt a user to input a second retrieval condition different from the first retrieval condition;

second input means for inputting the second retrieval condition in accordance with the question outputted by said output means; and retrieval means for retrieving image data based on the first and second retrieval conditions, wherein said analysis means analyzes a morpheme and modification of the first retrieval condition to acquire a retrieval object name constituting the first retrieval condition and an outer appearance feature of an object represented by the retrieval object name, and wherein said analysis means comprises:

storage means for storing a synonym/concept dictionary for managing synonyms in units of concepts, extraction means for extracting a word corresponding to the retrieval object name by looking up the synonym/concept dictionary, and calculation means for calculating an image feature amount with respect to an image feature weight based on the word extracted by the extraction means and the outer appearance feature.

2. The apparatus according to claim 1, wherein, when the outer appearance feature of the object represented by the retrieval object name has not been acquired by said analysis means, said output means outputs a question to prompt the user to input the outer appearance feature of the object represented by the retrieval object name.

3. The apparatus according to claim 2, wherein, when the question has been outputted by said output means to prompt the user to input the outer appearance feature of the object represented by the retrieval object name, said second input means inputs the outer appearance feature of the object represented by the retrieval object name in accordance with the question.

4. The apparatus according to claim 1, wherein, when the outer appearance feature of the object represented by the retrieval object name has been inputted by said second input means, the calculation means calculates an image feature amount based on a word extracted by the extraction means and the outer appearance feature.

5. The apparatus according to claim 1, wherein, when a word corresponding to the retrieval object name has not been extracted by the extraction means, said output means outputs a question to prompt the user to input a word having a concept close to the object represented by the retrieval object name.

6. The apparatus according to claim 5, wherein, when the question has been outputted by said output means to prompt the user to input the word having a concept close to the object represented by the retrieval object name, said second input means inputs a word having a concept close to the object represented by the retrieval object name and an outer appearance feature of an object represented by the word in accordance with the question.

7. The apparatus according to claim 6, wherein, when a word having a concept close to the object represented by the retrieval object name and an outer appearance feature of an object represented by the word have been inputted by said second input means, the calculation means calculates an image feature amount based on the word and the outer appearance feature.

8. The apparatus according to claim 6, wherein, when the word having the concept close to the object represented by the retrieval object name has been inputted by said second input means, the retrieval object name is registered in the synonym/concept dictionary based on a conceptual level of the word.

9. A method of controlling an image processing for managing image data, comprising:

a first input step of inputting a first retrieval condition for retrieving desired image data;

an analysis step of analyzing the inputted first retrieval condition;

an output step of outputting a question based on an analysis result in said analysis step to prompt a user to input a second retrieval condition different from the first retrieval condition;

a second input step of inputting the second retrieval condition in accordance with the outputted question; and a retrieval step of retrieving image data based on the first and second retrieval conditions, wherein said analysis step includes analyzing a morpheme and modification of the first retrieval condition to acquire a retrieval object name constituting the first retrieval condition and an outer appearance feature of an object represented by the retrieval object name, and wherein said analysis step comprises:

a storage step of storing a synonym/concept dictionary for managing synonyms in units of concepts, an extraction step of extracting a word corresponding to the retrieval object name by looking up the synonym/concept dictionary, and a calculation step of calculating an image feature amount with respect to an image feature weight based on the word extracted in the extraction step and the outer appearance feature.

10. The method according to claim 9, wherein, when the outer appearance feature of the object represented by the retrieval object name has not been acquired in said analysis step, said output step includes outputting a question to prompt the user to input the outer appearance feature of the object represented by the retrieval object name.

11. The method according to claim 10, wherein, when the question has been outputted in said output step to prompt the user to input the outer appearance feature of the object represented by the retrieval object name, said second input step includes inputting the outer appearance feature of the object represented by the retrieval object name in accordance with the question.

12. The method according to claim 9, wherein, when the outer appearance feature of the object represented by the retrieval object name has been inputted in said second input step, the calculation step includes calculating an image feature amount based on a word extracted in the extraction step and the outer appearance feature.

13. The method according to claim 9, wherein, when a word corresponding to the retrieval object name has not been extracted in the extraction step, said output step includes outputting a question to prompt the user to input a word having a concept close to the object represented by the retrieval object name.

14. The method according to claim 13, wherein, when the question has been outputted in said output step to prompt the user to input the word having a concept close to the object represented by the retrieval object name, said second input step includes inputting a word having a concept close to the object represented by the retrieval object name and an outer appearance feature of an object represented by the word in accordance with the question.

15. The method according to claim 14, wherein, when a word having a concept close to the object represented by the retrieval object name and an outer appearance feature of an object represented by the word have been inputted in said second input step, the calculation step includes calculating an image feature amount based on the word and the outer appearance feature.

16. The method according to claim 14, wherein, when the word having the concept close to the object represented by the retrieval object name has been inputted in said second input step, the retrieval object name is registered in the synonym/concept dictionary based on a conceptual level of the word.

17. A computer-readable memory medium storing a program for implementing a method of controlling an image processing apparatus for managing image data, the program comprising:

program code for a first input step of inputting a first retrieval condition for retrieving desired image data;

program code for an analysis step of analyzing the inputted first retrieval condition;

program code for an output step of outputting a question based on an analysis result in the analysis step to prompt a user to input a second retrieval condition different from the first retrieval condition;

program code for a second input step of inputting the second retrieval condition in accordance with the outputted question; and program code for a retrieval step of retrieving image data based on the first and second retrieval conditions, wherein the analysis step includes analyzing a morpheme and modification of the first retrieval condition to acquire a retrieval object name constituting the first retrieval condition and an outer appearance feature of an object represented by the retrieval object name, and wherein the analysis step comprises:
- a storage step of storing a synonym/concept dictionary for managing synonyms in units of concepts,
- an extraction step of extracting a word corresponding to the retrieval object name by looking up the synonym/concept dictionary, and
- a calculation step of calculating an image feature amount with respect to an image feature weight based on the word extracted by the extraction step and the outer appearance feature.

18. An image processing apparatus for managing image data, comprising:

input means for inputting a retrieval condition for retrieving desired image data;

first retrieval means for retrieving image data having retrieval information corresponding to the retrieval condition inputted by said input means by looking up a retrieval information index stored in a storage medium, wherein the retrieval information index indicates correspondence between the image data and its retrieval information added for retrieval;

execution means for setting a new retrieval condition with a second conceptual level different from a first conceptual level of the retrieval condition, in accordance with a retrieval result from said first retrieval means, and repeatedly executing retrieval by said first retrieval means;

acquisition means for monitoring a level of the new retrieval condition set by said execution means and acquiring image data retrieved by said first retrieval means in accordance with a monitoring result;

second retrieval means for retrieving image data similar to the image data acquired by said acquisition means based on an image feature amount of the image data by looking up an image feature amount index stored in the storage medium, wherein the image feature amount index indicates correspondence between the image data and its image feature amount; and display means for displaying image data corresponding to the retrieval condition based on the image data acquired by said acquisition means and image data retrieved by said second retrieval means.

19. The apparatus according to claim 18, further comprising storage means for storing a synonym/concept dictionary for managing synonyms in units of concepts.

20. The apparatus according to claim 19, wherein, when no image data has been retrieved under the retrieval condition inputted by said input means, said execution means acquires a synonym of a conceptual level next to a conceptual level of the retrieval condition by looking up the synonym/concept dictionary and sets the acquired synonym as a new retrieval condition.

21. The apparatus according to claim 19, wherein, when no image data has been retrieved under the retrieval condition inputted by said input means, said execution means acquires a synonym within a predetermined conceptual level from a conceptual level of the retrieval condition by looking up the synonym/concept dictionary and sets the acquired synonym as a new retrieval condition.

22. The apparatus according to claim 18, wherein the storage medium stores correspondence between image feature amounts of a plurality of representative image data and the representative image data in the image feature a mount index in advance.

23. The apparatus according to claim 22, wherein the representative image data is image data to be retrieved by said first retrieval means at a frequency higher than a predetermined value and has the retrieval information.

24. The apparatus according to claim 23, wherein the storage medium stores correspondence between retrieval information of the representative image data and the representative image data in the retrieval information index in advance.

25. The apparatus according to claim 24, wherein, when the image data acquired by said acquisition means includes the representative image data, said second retrieval means retrieves image data similar to the image data based on an image feature amount of the representative image data by looking up the image feature amount index.

26. The apparatus according to claim 18, wherein said display means displays the image data corresponding to the retrieval condition as thumbnail images.

27. The apparatus according to claim 26, wherein, when one of the thumbnail images displayed by said display means is selected, and display of a full-size image of the selected thumbnail image is requested, the storage medium stores the retrieval condition as retrieval information of image data corresponding to the thumbnail image in the retrieval information index in correspondence with the image data.

28. The apparatus according to claim 18, wherein the image data is obtained by reading a natural image.

29. A method of controlling an image processing apparatus for managing image data, comprising:

an input step of inputting a retrieval condition for retrieving desired image data;

a first retrieval step of retrieving image data having retrieval information corresponding to the retrieval condition inputted in said input step by looking up a retrieval information index stored in a storage medium, wherein the retrieval information index indicates correspondence between the image data and its retrieval information added for retrieval;

an execution step of setting a new retrieval condition with a second conceptual level different from a first conceptual level of the retrieval condition in accordance with a retrieval result in said first retrieval step, and repeatedly executing retrieval in said first retrieval step;

an acquisition step of monitoring a level of the new retrieval condition set in said execution step and acquiring image data retrieved in said first retrieval step in accordance with a monitoring result;

a second retrieval step of retrieving image data similar to the image data acquired in said acquisition step based on an image feature amount of the image data by looking up the image feature amount index stored in the storage medium, wherein the image feature amount index indicates correspondence between the image data and its image feature amount; and a display step of displaying image data corresponding to the retrieval condition based on the image data acquired in said acquisition step and image data retrieved in said second retrieval step.

30. The method according to claim 29, further comprising a storage step of storing a synonym/concept dictionary for managing synonyms in units of concepts.

31. The method according to claim 30, wherein said execution step includes, when no image data has been retrieved under the retrieval condition inputted in said input step, acquiring a synonym of a conceptual level next to a conceptual level of the retrieval condition by looking up the synonym/concept dictionary and setting the acquired synonym as a new retrieval condition.

32. The method according to claim 30, wherein said execution step includes, when no image data has been retrieved under the retrieval condition inputted in said input step, acquiring a synonym within a predetermined conceptual level from a conceptual level of the retrieval condition by looking up the synonym/concept dictionary and setting the acquired synonym as a new retrieval condition.

33. The method according to claim 29, wherein the storage medium stores correspondence between image feature amounts of a plurality of representative image data and the representative image data in the image feature amount index in advance.

34. The method according to claim 33, wherein the representative image data is image data to be retrieved in said first retrieval step at a frequency higher than a predetermined value and has the retrieval information.

35. The method according to claim 34, wherein the storage medium stores correspondence between the retrieval information of the representative image data and the representative image data in the retrieval information index in advance.

36. The method according to claim 35, wherein said second retrieval step includes, when the image data acquired in said acquisition step includes the representative image data, retrieving image data similar to the image data based on an image feature amount of the representative image data by looking up the image feature amount index.

37. The method according to claim 29, wherein said display step includes displaying the image data corresponding to the retrieval condition as thumbnail images.

38. The method according to claim 37, wherein, when one of the thumbnail images displayed in said display step is selected, and display of a full-size image of the selected thumbnail image is requested, the retrieval condition is stored in the storage medium as retrieval information of image data corresponding to the thumbnail image in the retrieval information index in correspondence with the image data.

39. The method according to claim 29, wherein the image data is obtained by reading a natural image.

40. A computer-readable memory medium storing a program for implementing a method of controlling an image processing apparatus for managing image data, the program comprising:

program code for an input step of inputting a retrieval condition for retrieving desired image data;

program code for a first retrieval step of retrieving image data having retrieval information corresponding to the retrieval condition inputted in the input step by looking up a retrieval information index stored in a storage medium, wherein the retrieval information index indicates correspondence between the image data and its retrieval information added for retrieval;

program code for an execution step of setting a new retrieval condition with a second conceptual level different from a first conceptual level of the retrieval condition in accordance with a retrieval result in the first retrieval step, and repeatedly executing retrieval in the first retrieval step;

program code for an acquisition step of monitoring a level of the new retrieval condition set in the execution step and acquiring image data retrieved in the first retrieval step in accordance with a monitoring result;

program code for a second retrieval step of retrieving image data similar to the image data acquired in the acquisition step based on an image feature amount of the image data by looking up an image feature amount index stored in the storage medium, wherein the image feature amount index indicates correspondence between the image data and its image feature amount; and program code for a display step of displaying image data corresponding to the retrieval condition based on the image data acquired in the acquisition step and image data retrieved in the second retrieval step.

41. An image processing apparatus for managing image data, comprising:

input means for inputting a retrieval condition for retrieving desired image data;

first retrieval means for retrieving image data having retrieval information corresponding to the retrieval condition inputted by said input means by looking up a retrieval information index stored in a storage medium, wherein the retrieval information index indicates correspondence between the image data and its retrieval information added for retrieval;

execution means for setting a new retrieval condition with any conceptual distance from a concept of the retrieval condition, in accordance with a retrieval result from said first retrieval means, and repeatedly executing retrieval by said first retrieval means;

acquisition means for monitoring that a conceptual distance of the new retrieval condition set by said execution means has been reached according to a predetermined conceptual distance and acquiring image data retrieved by said first retrieval means in accordance with a monitoring result;

second retrieval means for retrieving image data similar to the image data retrieved by said first retrieval means based on an image feature amount of the image data by looking up an image feature amount index stored in the storage medium, wherein said image feature amount index indicates correspondence between the image data and its image feature amount; and display means for displaying image data corresponding to the retrieval condition based on the image data retrieved by said first retrieval means and image data retrieved by said second retrieval means.

42. The apparatus according to claim 41, wherein the storage medium stores a synonym/concept dictionary for managing synonyms in units of concepts.

43. The apparatus according to claim 42, wherein, when no image data has been retrieved under the retrieval condition, said first retrieval means retrieves image data again while setting a synonym closest to a concept of the retrieval condition as a retrieval condition by looking up the synonym/concept dictionary.

44. The apparatus according to claim 42, wherein, when no image data has been retrieved under the retrieval condition, said first retrieval means retrieves image data again while setting a synonym within a predetermined conceptual distance from a concept of the retrieval condition as a retrieval condition by looking up the synonym/concept dictionary.

45. The apparatus according to claim 42, wherein, when no image data has been retrieved under the retrieval condition, said first retrieval means retrieves image data again while setting, as a retrieval condition, a synonym having a concept independent of the retrieval condition, a synonym for which a conceptual distance sum from a concept of the retrieval condition has a predetermined value, or each of three synonyms in ascending order of conceptual distance sums from a concept of the retrieval condition by looking up the synonym/concept dictionary.

46. The apparatus according to claim 41, wherein the storage medium stores correspondence between image feature amounts of a plurality of typical and high-quality representative image data and the representative image data in the image feature amount index in advance.

47. The apparatus according to claim 46, wherein the representative image data is image data to be retrieved by said first retrieval means at a frequency higher than a predetermined value and has the retrieval information.

48. The apparatus according to claim 47, wherein the storage medium stores correspondence between the retrieval information of the representative image data and the representative image data in the retrieval information index in advance.

49. The apparatus according to claim 48, wherein, when the image data acquired by said acquisition means includes the representative image data, said second retrieval means retrieves image data similar to the image data based on an image feature amount of the representative image data by looking up the image feature amount index.

50. The apparatus according to claim 41, wherein, when the retrieval condition contains predetermined information representing an image feature amount, said second retrieval means retrieves image data similar to the image data retrieved by said first retrieval means based on the image feature amount and the image data retrieved by said first retrieval means by looking up the image feature amount index.

51. The apparatus according to claim 41, wherein said display means displays the image data corresponding to the retrieval condition as thumbnail images.

52. The apparatus according to claim 51, wherein when one of the thumbnail images displayed by said display means is selected, and display of a full-size image of the selected thumbnail image is requested, the storage medium stores the retrieval condition as retrieval information of image data corresponding to the thumbnail image in the retrieval information index in correspondence with the image data.

53. The apparatus according to claim 41, wherein the image data is obtained by reading a natural image.

54. A method of controlling an image processing apparatus for managing image data, comprising:
   an input step of inputting a retrieval condition for retrieving desired image data;
   a first retrieval step of retrieving image data having retrieval information corresponding to the retrieval condition inputted in said input step by looking up a retrieval information index stored in a storage medium, wherein the retrieval information index indicates correspondence between the image data and its retrieval information added for retrieval;
   an execution step of setting a new retrieval condition with any conceptual distance from a concept of the retrieval condition in accordance with a retrieval result from said first retrieval step, and repeatedly executing retrieval according to said first retrieval step;
   an acquisition step of monitoring that a conceptual distance of the new retrieval condition set in said execution step has been reached, according to a predetermined conceptual distance, and acquiring image data retrieved in said first retrieval step in accordance with a monitoring result;
   a second retrieval step of retrieving image data similar to the image data retrieved in said first retrieval step based on an image feature amount of the image data by looking up an image feature amount index stored in the storage medium, wherein the image feature amount index indicates correspondence between the image data and its image feature amount; and
   a display step of displaying image data corresponding to the retrieval condition based on the image data retrieved in said first retrieval step and image data retrieved in said second retrieval step.

55. The method according to claim 54, wherein the storage medium stores a synonym/concept dictionary for managing synonyms in units of concepts.

56. The method according to claim 55, wherein said first retrieval step includes, when no image data has been retrieved under the retrieval condition, retrieving image data again while setting a synonym closest to a concept of the retrieval condition as a retrieval condition by looking up the synonym/concept dictionary.

57. The method according to claim 55, wherein said first retrieval step includes, when no image data has been retrieved under the retrieval condition, retrieving image data again while setting a synonym within a predetermined conceptual distance from a concept of the retrieval condition as a retrieval condition by looking up the synonym/concept dictionary.

58. The method according to claim 55, wherein said first retrieval step includes, when no image data has been retrieved under the retrieval condition, retrieving image data again while setting, as a retrieval condition, a synonym having a concept independent of the retrieval condition, a synonym for which a conceptual distance sum from a concept of the retrieval condition has a predetermined value, or each of three synonyms in ascending order of conceptual distance sums from a concept of the retrieval condition by looking up the synonym/concept dictionary.

59. The method according to claim 54, wherein the storage medium stores correspondence between image feature amounts of a plurality of typical and high-quality representative image data and the representative image data in the image feature amount index in advance.

60. The method according to claim 59, wherein the representative image data is image data to be retrieved in the first retrieval step at a frequency higher than a predetermined value and has the retrieval information.

61. The method according to claim 60, wherein the storage medium stores correspondence between the retrieval information of the representative image data and the representative image data in the retrieval information index in advance.

62. The method according to claim 61, wherein the second retrieval step includes, when the image data acquired in said acquisition step includes the representative image data, retrieving image data similar to the image data based on an image feature amount of the representative image data by looking up the image feature amount index.

63. The method according to claim 54, wherein the second retrieval step includes, when the retrieval condition contains predetermined information representing an image feature amount, retrieving image data similar to the image data retrieved in said first retrieval step based on the image feature amount and the image data retrieved in the first retrieval step by looking up the image feature amount index.

64. The method according to claim 54, wherein said display step includes displaying the image data corresponding to the retrieval condition as thumbnail images.

65. The method according to claim 64, wherein, when one of the thumbnail images displayed in the display step is selected, and display of a full-size image of the selected thumbnail image is requested, said second storage step includes storing the retrieval condition as retrieval information of image data corresponding to the thumbnail image in the retrieval information index in correspondence with the image data.

66. The method according to claim 54, wherein the image data is obtained by reading a natural image.

67. A computer-readable memory medium storing a program for implementing a method of controlling an image processing apparatus for managing image data, the program comprising:

program code for an input step of inputting a retrieval condition for retrieving desired image data;

program code for a first retrieval step of retrieving image data having retrieval information corresponding to the retrieval condition inputted in the input step by looking up a retrieval information index stored in a storage medium, wherein the retrieval information index indicates correspondence between the image data and its retrieval information added for retrieval;

program code for an execution step of setting a new retrieval condition with any conceptual distance from a concept of the retrieval condition in accordance with a retrieval result from the first retrieval step, and repeatedly executing retrieval according to the first retrieval step;

program code for an acquisition step of monitoring that a conceptual distance of the new retrieval condition set in the execution step has been reached, according to a predetermined conceptual distance, and acquiring image data retrieved in the first retrieval step in accordance with a monitoring result;

program code for a second retrieval step of retrieving image data similar to the image data retrieved in the first retrieval step based on an image feature amount of the image data by looking up an image feature amount index stored in the storage medium, wherein the image feature amount index indicates correspondence between the image data and its image feature amount; and program code for a display step of displaying image data corresponding to the retrieval condition based on the image data retrieved in the first retrieval step and image data retrieved in the second retrieval step.

\* \* \* \* \*